(12) United States Patent
Junge et al.

(10) Patent No.: US 10,055,111 B2
(45) Date of Patent: Aug. 21, 2018

(54) METHOD AND APPARATUS FOR PROVIDING NOTIFICATIONS ON RECONFIGURATION OF A USER ENVIRONMENT

(71) Applicant: HERE Global B.V., Veldhoven (NL)

(72) Inventors: Mary Anne Junge, Elgin, IL (US); Gregg Bresnahan, Wheaton, IL (US); William Gigliotti, Spring Grove, IL (US); James Halik, Elgin, IL (US); David Mauer, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 279 days.

(21) Appl. No.: 14/839,084

(22) Filed: Aug. 28, 2015

(65) Prior Publication Data

US 2017/0060397 A1 Mar. 2, 2017

(51) Int. Cl.
*G06F 3/048* (2013.01)
*G06F 3/0484* (2013.01)
(Continued)

(52) U.S. Cl.
CPC ........ *G06F 3/04847* (2013.01); *B60R 16/037* (2013.01); *G06F 3/0482* (2013.01); *G06F 3/04817* (2013.01)

(58) Field of Classification Search
CPC ............. G06F 3/04847; G06F 3/04817; G06F 3/0482; G06F 3/048; B60R 16/037
See application file for complete search history.

(56) References Cited

U.S. PATENT DOCUMENTS 8,437,919 B2 * 5/2013 Wang ................ B60R 21/01512
701/1
8,880,270 B1 11/2014 Ferguson et al.
(Continued)

FOREIGN PATENT DOCUMENTS

CA 2759783 A1 5/2013
JP 2007315896 A 12/2007

OTHER PUBLICATIONS

Wood, "Video Feature: Inside the F 015, Mercedes's Self-Driving Car", The New York Times, Mar. 19, 2015, retrieved on Sep. 29, 2015 from http://www.nytimes.com/2015/03/20/automobiles/video-feature-inside-the-f-015-mercedess-self-driving-car.html?_r=1, 4 Pages.
(Continued)

*Primary Examiner* — Mahelet Shiberou
(74) *Attorney, Agent, or Firm* — Ditthavong & Steiner, P.C.

(57) ABSTRACT

An approach is provided for determining and presenting notifications and options to users for reconfiguring a vehicle environment of the users. The approach includes determining whether to initiate a reconfiguration of a vehicle environment for one or more users based, at least in part, on one or more reconfiguration criteria. The approach also includes determining a reconfiguration model for the vehicle environment based, at least in part, on one or more preferences associated with the one or more users. The approach further includes causing, at least in part, a presentation of one or more notifications about the reconfiguration model to the one or more users. Furthermore, the approach includes determining one or more responses from the one or more users based, at least in part, on the presentation. Additionally, the approach includes initiating the reconfiguration of
(Continued)

the vehicle environment based, at least in part, on the one or more responses.

20 Claims, 16 Drawing Sheets

(51) Int. Cl.
    *G06F 3/0482*     (2013.01)
    *G06F 3/0481*     (2013.01)
    *B60R 16/037*     (2006.01)

(56) References Cited

U.S. PATENT DOCUMENTS

| | | | |
|---|---|---|---|
| 9,340,155 B2* | 5/2016 | Pisz | B60H 1/00642 |
| 9,783,206 B2* | 10/2017 | Sugioka | B60W 50/10 |
| 2009/0160229 A1* | 6/2009 | Mabuchi | B60N 2/01 |
| | | | 297/217.3 |
| 2013/0030645 A1* | 1/2013 | Divine | B60K 35/00 |
| | | | 701/36 |
| 2013/0293364 A1* | 11/2013 | Ricci | B60K 35/00 |
| | | | 340/425.5 |
| 2013/0293452 A1* | 11/2013 | Ricci | G02B 27/01 |
| | | | 345/156 |
| 2014/0277894 A1 | 9/2014 | Doyle et al. | |
| 2014/0310594 A1* | 10/2014 | Ricci | H04W 48/04 |
| | | | 715/702 |
| 2015/0094899 A1 | 4/2015 | Hackenberg et al. | |
| 2015/0137564 A1 | 5/2015 | Cuddihy et al. | |
| 2015/0142246 A1* | 5/2015 | Cuddihy | B62D 1/183 |
| | | | 701/23 |
| 2016/0033964 A1* | 2/2016 | Sato | B60K 28/06 |
| | | | 701/24 |

OTHER PUBLICATIONS

Thomas, "Autonomous Cars in the Age of Experience", 3D Perspectives, Jun. 17, 2014, retrieved on Sep. 29, 2015 from http://perspectives.3ds.com/transportation-mobility/autonomous-cars-in-the-age-of-experience/, 6 Pages.

Muaddi, "Johnson Controls Unveils its ID15 Concept Interior", The Hog Ring, Auto Upholstery Community, Jan. 16, 2015, retrieved on Sep. 29, 2015 from http://www.thehogring.com/2015/01/16/johnson-controls-unveils-its-id15-concept-interior/, 3 Pages.

Designboom, "rinspeed XchangE autonomous EV is an office + living room on wheels", Web Page, Feb. 18, 2014, retrieved on Sep. 29, 2015 from http://www.designboom.com/technology/rinspeed-xchange-autonomous-electric-car-is-a-living-room-on-wheels-02-18-2014/, 9 Pages.

Knight, "A Test Drive of the Most Advanced Driverless Cars", MIT Technology Review, Web Page, Oct. 22, 2013, retrieved on Sep. 29, 2015 from http://www.technologyreview.com/featuredstory/520431/driverless-cars-are-further-away-than-you-think/, 13 Pages.

* cited by examiner

METHOD AND APPARATUS FOR PROVIDING NOTIFICATIONS ON RECONFIGURATION OF A USER ENVIRONMENT

BACKGROUND

Service providers and device manufacturers (e.g., wireless, cellular, etc.) are continually challenged to deliver value and convenience to consumers by, for example, determining reconfiguration of a user environment and providing notifications to users in that environment before or after the reconfiguration. With technological advances in configuration of user environments (e.g., rooms, vehicles, offices, etc.), service providers or devices in an environment may determine that a reconfiguration of a given environment may provide additional functionality or benefit to users in that environment. One area of interest is use of autonomous/semi-autonomous (ASA) vehicles for use by different users for different tasks. For example, the ASA vehicles may be used to transport people from one point to another, carry cargo, collect information about given points of interest (POIs), or for other like tasks. Since a reconfiguration may affect physical and functional aspects of a user environment, proper notifications of the reconfiguration would need to be determined and presented to the users in that environment. As a result, service providers face significant technical challenges in determining reconfiguration of a user vehicle environment and providing notifications to the users in that environment.

Some Example Embodiments

Therefore, there is a need for an approach to determine and present notifications and options to users for reconfiguring a vehicle environment of the users.

According to one embodiment, a method comprises determining whether to initiate a reconfiguration of at least one vehicle environment for one or more users based, at least in part, on one or more reconfiguration criteria. The method also comprises determining at least one reconfiguration model for the at least one vehicle environment based, at least in part, on one or more preferences associated with the one or more users. The method further comprises causing, at least in part, a presentation of one or more notifications about the at least one reconfiguration model to the one or more users. Furthermore, the method comprises determining one or more responses from the one or more users based, at least in part, on the presentation. Also, the method comprises initiating the reconfiguration of the at least one vehicle environment based, at least in part, on the one or more responses.

According to another embodiment, an apparatus comprises at least one processor, and at least one memory including computer program code for one or more computer programs, the at least one memory and the computer program code configured to, with the at least one processor, cause, at least in part, the apparatus to determine whether to initiate a reconfiguration of at least one vehicle environment for one or more users based, at least in part, on one or more reconfiguration criteria. The apparatus is also caused to determine at least one reconfiguration model for the at least one vehicle environment based, at least in part, on one or more preferences associated with the one or more users. The apparatus is further caused to cause, at least in part, a presentation of one or more notifications about the at least one reconfiguration model to the one or more users. Also, the apparatus is caused to determine one or more responses from the one or more users based, at least in part, on the presentation. Additionally, the apparatus is caused to initiate the reconfiguration of the at least one vehicle environment based, at least in part, on the one or more responses.

According to another embodiment, a computer-readable storage medium carries one or more sequences of one or more instructions which, when executed by one or more processors, cause, at least in part, an apparatus to determine whether to initiate a reconfiguration of at least one vehicle environment for one or more users based, at least in part, on one or more reconfiguration criteria. The apparatus is also caused to determine at least one reconfiguration model for the at least one vehicle environment based, at least in part, on one or more preferences associated with the one or more users. The apparatus is further caused to cause, at least in part, a presentation of one or more notifications about the at least one reconfiguration model to the one or more users. Also, the apparatus is caused to determine one or more responses from the one or more users based, at least in part, on the presentation. Additionally, the apparatus is caused to initiate the reconfiguration of the at least one vehicle environment based, at least in part, on the one or more responses.

According to another embodiment, an apparatus comprises means for determining whether to initiate a reconfiguration of at least one vehicle environment for one or more users based, at least in part, on one or more reconfiguration criteria. The apparatus also comprises means for determining at least one reconfiguration model for the at least one vehicle environment based, at least in part, on one or more preferences associated with the one or more users. The apparatus further comprises means for causing, at least in part, a presentation of one or more notifications about the at least one reconfiguration model to the one or more users. Furthermore, the apparatus comprises means for determining one or more responses from the one or more users based, at least in part, on the presentation. Also, the apparatus also comprises means for initiating the reconfiguration of the at least one vehicle environment based, at least in part, on the one or more responses.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-49.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining and presenting notifications and options to users for reconfiguring an environment of the users are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to determining and presenting notifications and options to users for reconfiguring an environment in a vehicle, it is contemplated that the approach described herein may be applicable to any invention that can be modelled according the example processes described below and can benefit from determining and presenting notifications and options to users for reconfiguring an environment of the users.

Figure 1:
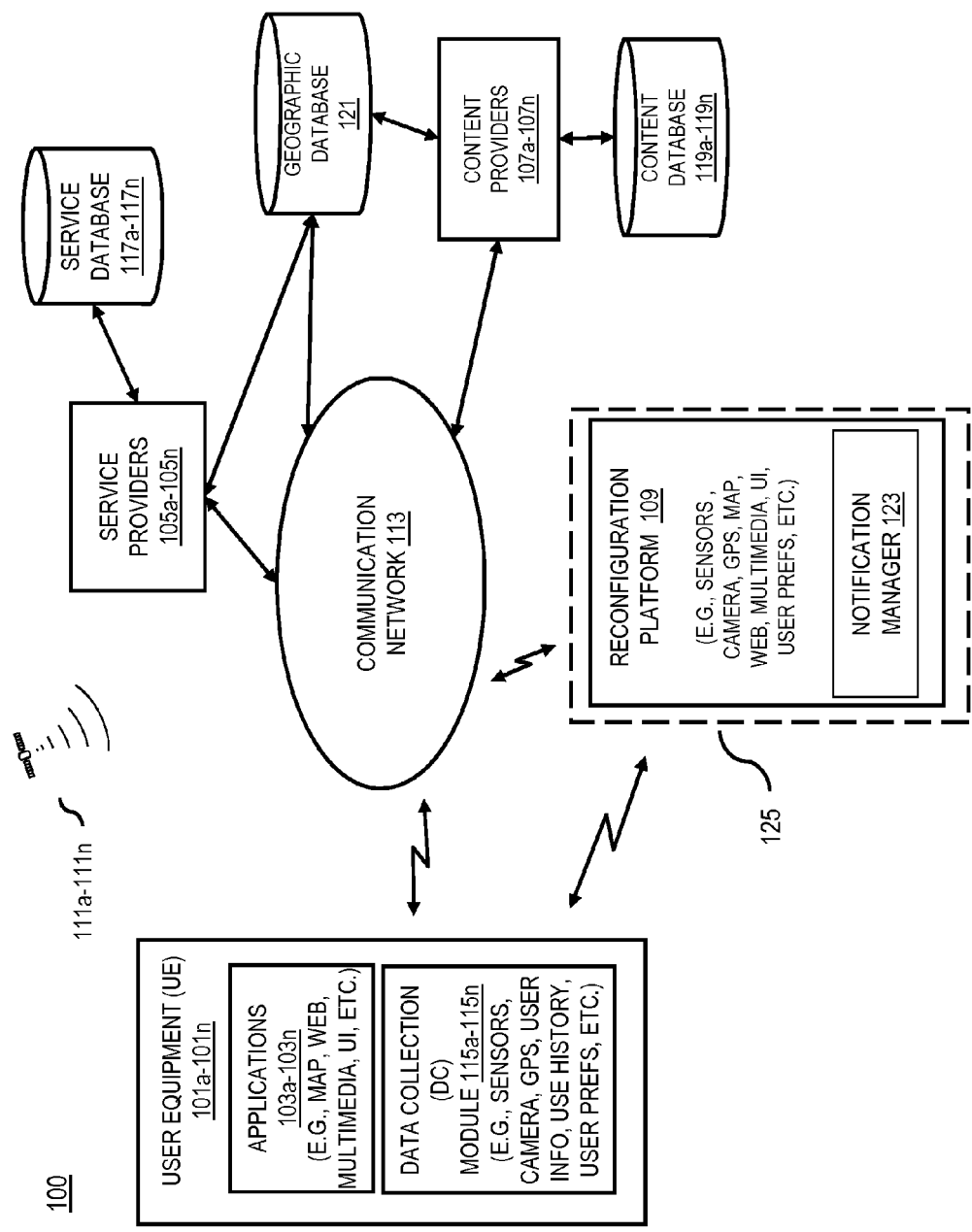
FIG. 1 is a diagram of a system capable of determining and presenting notifications and options to users for reconfiguring a vehicle environment of the users, according to an embodiment.

FIG. 1 is a diagram of a system capable of determining and presenting notifications and options to users for reconfiguring a vehicle environment of the users, according to one embodiment. As previously discussed, one area of interest among service providers and device manufacturers has been ASA vehicles for use by different users for different tasks. The ASA vehicles may include various levels of technology for controlling and preforming different tasks. For example, control systems of an ASA vehicle may utilize information about a travel path to guide the vehicle along the path while requiring little or no interaction with a driver/user of the vehicle. In some scenarios, a service provider and/or applications in an ASA vehicle may determine and initiate a reconfiguration of the ASA vehicle, from an initial configuration to a different one that may be more suitable or efficient for a given scenario. In some instances, reconfiguration of an ASA vehicle may apply to physical aspects of its interior or exterior, or to functionalities of some of its interior or exterior features. For example, seating arrangements in an ASA vehicle may be reconfigured, or functionalities of certain devices in the vehicle may be changed or suspended, etc. However, as reconfigurations of an ASA vehicle can impact its users; e.g., driver/passengers (occupants), proper notifications and options for the reconfigurations need to be communicated to the users.

To address, at least, these problems, a system 100 introduces a capability for determining and presenting notifications and options to users for reconfiguring an environment of the users. ASA vehicles may include advanced technologies to guide the vehicle from an origin point to a destination point, for example, by use Global Navigation Satellite System (GNSS), e.g., a Global Positioning System (GPS), or similar systems for map/geographic location information. Therefore, an ASA vehicle may not require continuous driver/pilot interaction when traveling from the origin to the destination. For instance, the ASA vehicle may require driver interaction when within a busy section of a city (e.g., city center). Hence, it is possible that various features of an ASA vehicle may be reconfigurable, for example, by a reconfiguration platform/application implemented in the ASA vehicle or at a service provider so that the occupants may attend to and participate in various activities while the ASA vehicle is controlling the vehicle along the travel path. As noted, the reconfigurations may include changes to the physical or functional aspects of an ASA vehicle as supported by the systems and features of the vehicle. Also, the reconfiguration options may be based on various criteria associated with the occupants, location of the vehicle, a moving or stationary vehicle, traveling speed, or the like criteria. Examples of reconfiguration options may include allowing seats in the vehicle to fully recline for relaxing or sleeping; allowing front and back seats to swivel to any configuration so that front and back seat passengers may easily interact; passengers in the back seats may swivel around to face the back of the vehicle for viewing/interacting with different contents (e.g., movies, TV shows, video games, etc.), on a back video monitor, than the passenger in the front seats.

Additionally, the reconfiguration options may include providing a pop-up table between the front and back seats for use (e.g., play games or cards) by the passengers, changing characteristics of the windshield or the rear window so they may be utilized as separate video monitors, providing a workstation so the passengers may work on their laptops, changing characteristics of the side windows so they may be used as mirrors (e.g., for makeup), or other like options.

In one scenario, the reconfiguration platform may determine and present a reconfiguration model and possible options to the occupants in an ASA vehicle, where the driver and/or the passengers may be able to select from one or more options. Upon evaluation of the selected options as well as reconfiguration criteria associated with the ASA vehicle, the reconfiguration platform may validate one or more of the selected options and proceed to generating and presenting appropriate notifications to the occupants. In various examples, the reconfiguration notifications or the options may be presented via one or more devices of the ASA vehicle or via user devices of the occupants. In some instances, reconfiguration of a given feature of the ASA vehicle may require a confirmation from the occupants whereas in other instances, the reconfiguration may proceed after presentation of the notifications.

In another scenario, the reconfiguration platform may initiate a process to undo (e.g., return to original configuration) one or more of the reconfigured features in the ASA vehicle. Upon determining a need to return some or all features of the ASA vehicle to an original configuration/state, the reconfiguration platform may generate and present the appropriate notifications to the occupants of the vehicle. In some instances, returning a feature (e.g., a driver seat) to its original configuration may be essential before other changes (e.g., guidance system of the ASA vehicle) can be made, wherein a warning may be presented to the driver. The notification on returning to an original configuration may be based on criteria determined by the driver, the reconfiguration platform, the ASA vehicle system, regulatory bodies, industry standards, etc.; for example, based on a time or distance to destination, unexpected events at the ASA vehicle or along the travel path, proximity to certain POIs, or the like.

In one embodiment, the system 100 may determine whether to initiate a reconfiguration of at least one vehicle environment for one or more users based, at least in part, on one or more reconfiguration criteria. In various embodiments, the reconfiguration criteria may be based on information associated with a location of the vehicle environment (e.g., near a city center, a mountainous area, a freeway, moving, stationary, etc.), dynamic environmental information (e.g., weather, traffic, etc.), POIs along a travel route (e.g., restaurants, hotels, check stations, etc.), physical features and characteristics (e.g., interior and exterior) of a vehicle in a vehicle environment, parameters predefined by the owner/driver of the vehicle, characteristics of the occupants (e.g., age, gender, any particular physical attributes, etc.) in the vehicle environment, or the like information. For example, the system 100 may determine presence of some occupants in an ASA vehicle, capabilities of the ASA vehicle, location of the ASA vehicle, predefined criteria for a reconfiguration of the ASA vehicle, ASA vehicle regulations at the current location, or the like information that may assist in determining whether to initiate a reconfiguration.

In one embodiment, the system 100 may determine at least one reconfiguration model for the at least one vehicle environment based, at least in part, on one or more preferences associated with the one or more users. In various embodiments, user preferences from a previous reconfiguration model, user devices of the occupants in the vehicle environment, information available from service providers associated with the occupants, or the like information indicative of user preferences for reconfiguring a vehicle environment. For example, a reconfiguration model may include reconfiguring seating arrangements, control panels, video monitors, popup tables, windows, floor space, or the like features in an ASA vehicle.

In one embodiment, the system 100 may cause, at least in part, a presentation of one or more notifications about the at least one reconfiguration model to the one or more users. In one embodiment, the notifications may include information about reconfigurations of physical and/or functional features of a vehicle environment, wherein the reconfiguration may affect some or all occupants in the vehicle environment. In one embodiment, the notifications may include prompts to the occupants to select from one or more options in the reconfiguration model that may affect the vehicle environment and the occupants therein. In various scenarios, the notifications may include audio, visual or haptic alerts. In another embodiment, after determining to initiate a reconfiguration of the at least one vehicle environment, one or more notifications about the reconfiguration, based on the criteria, may be presented to the one or more users. For example, as soon as it is determined that a reconfiguration of a vehicle can be initiated, notifications that "a reconfiguration is possible" may be presented to the users that are in/around/associated with the vehicle.

In one embodiment, the system 100 may determine one or more responses from the one or more users based, at least in part, on the presentation. In one embodiment, the system 100 may receive one or more inputs/selections from the occupants in response to the notifications and options associated with the reconfiguration model for the vehicle environment of the occupants. For example, the driver may select to delay all or parts of a proposed reconfiguration of his ASA vehicle environment.

In one embodiment, the system 100 may initiate the reconfiguration of the at least one vehicle environment based, at least in part, on the one or more responses. In one embodiment, the system 100 may initiate the reconfiguration of all or portions of the vehicle environment based on the responses/selections received from the occupants in the vehicle environment. For example, the selections may indicate that passenger environments may be reconfigured now, but reconfiguration of the driver's environment is to be delayed for some time. In some instances, the responses may indicate one or more proposed changes to the reconfiguration model, wherein the system 100 may evaluate the proposed changes and accordingly provide additional notifications and options.

In one embodiment, the system 100 may cause, at least in part, the presentation of the one or more notifications via one or more user devices, one or more features in the at least one vehicle environment, or a combination thereof. In various embodiments, the notifications, options and any related information may be presented to the occupants in the vehicle environment via user devices (e.g., mobile phones, tablets, laptop computers, etc.) and/or devices available in the vehicle environment, for example, any audio (e.g., speakers) or visual (e.g., video monitors, lights, etc.) components in the vehicle. In one embodiment, the system 100 may temporarily reconfigure a device in the vehicle environment for presentation of the notifications to the occupants therein.

In one embodiment, the system 100 may determine one or more common characteristics associated with the one or more users. In various embodiments, the system 100 may analyze information available about the occupants in the vehicle environment to determine one or more common characteristics, elements, purpose, or the like information indicative of the occupants' purpose for being in the vehicle environment. For example, the analysis may indicate that the occupants in the vehicle are family members traveling to a vacation destination, or that the occupants are college friends on a road trip, or that the occupants are members of a sports team traveling to a sports event, or the like.

In one embodiment, the system 100 may determine the at least one reconfiguration model, the one or more notifications or a combination thereof based, at least in part, on the one or more common characteristics. For example, the reconfiguration model may be based on the common characteristic that the occupants are students traveling to an examination facility (e.g., a college), where the reconfiguration model may provide an environment for individual or group studies. In another example, the occupants may be children traveling to a summer camp, where the reconfiguration of the vehicle environment may provide video monitors or projector surfaces for displaying content about their camp and upcoming activities, wherein their seating arrangement may be reconfigured for optimal viewing position and resting posture. In one embodiment, the notifications and options about the reconfiguration model may be presented to one or more occupants based on the common characteristics of the occupants, where the notifications may be presented to one occupant for majority of the reconfiguration options and to the rest for certain options associated with each occupant (e.g., position of their seats).

In one embodiment, the system 100 may determine an estimated time of travel information from an origin point to a destination point for at least one vehicle associated with the at least one vehicle environment, wherein the at least one reconfiguration model for the at least one vehicle environment, the one or more notifications, or a combination thereof is based, at least in part, on the estimated time of travel. In various embodiments, the reconfiguration model may be based on a travel time from an origin to a destination point where, for example, a reconfiguration model may be suitable for a vehicle environment for a certain period of time. For example, reconfiguration of a vehicle environment for the occupants to rest and watch a movie may be suitable if the occupants can remain in the vehicle environment for a certain period of time (e.g., two hours). In another embodiment, the system 100 may determine a threshold for a remaining time to a destination point and once the threshold is met, the system 100 may present one or more notifications to the occupants about resetting the reconfigured vehicle environment to its original configuration. In one embodiment, a reconfiguration model may have a plurality of portions that may be implemented at different times or points of a travel route. For example, the reconfiguration model may begin with a rest environment, next a refreshments environment, then a personal care environment, or the like environments. In one embodiment, the system 100 may determine an estimated remaining travel time, remaining distance, or the like thresholds associated with a destination point for the at least one vehicle. For example, the system 100 may determine the thresholds from map data, itinerary data, vehicle traffic data, weather data, vehicle speed data, or the like information associated with the vehicle or close to location of the vehicle. In one embodiment, the system 100 may cause, at least in part, the presentation of the one or more notifications based, at least in part, on the thresholds. For example, once a minimum travel time or distance to a target destination is met, the notifications may be presented to the users.

In one embodiment, the system 100 may identify one or more activities, one or more services, or a combination thereof available at the destination point. In various embodiments, the system 100 may analyze information (e.g., travel itinerary of occupants, destination POI, etc.) associated with the occupants of the vehicle environment for determining activities or services that the occupants may be associated with or have an interest in. For example, at the destination point, the occupants may be able to dine, shop, prepare for a business meeting, shower or the like.

In one embodiment, the system 100 may cause, at least in part, the presentation of the one or more notifications based, at least in part, on the one or more activities, the one or more services, or a combination thereof. In one embodiment, the notifications may be based on an anticipated amount of time that the occupants may need to prepare for the activities or services. In one embodiment, responses received from the occupants may indicate an interest in the activities or the services, wherein the system 100 may update or initiate the reconfiguration model for all or some of the occupants based on their responses.

In one embodiment, the system 100 may cause, at least in part, the presentation of the one or more notifications, one or more user instructions, or a combination thereof to at least one controlling user. In one embodiment, one or more occupants may be identified as a controlling occupant, e.g., a driver, a coach, a parent, a guide, etc., who may be presented with the notifications and options about the reconfiguration model for the vehicle environment. In one scenario, notifications and options related to certain functions of a vehicle in the vehicle environment may be presented only to a driver of the vehicle, and notifications and options for environments of the passengers may be presented to a parent, a coach, a guide, or the like who is associated with the passengers.

In one embodiment, the system 100 may initiate the reconfiguration of the at least one vehicle environment based, at least in part, on one or more responses from the at least one controlling user. In one embodiment, the system 100 may request, receive, and analyze one or more responses from one or more controlling users/occupants for initiating reconfiguration of all or some of the vehicle environment. For example, a response from the driver of the vehicle may indicate that driver environment may be reconfigured whereas a response from a coach may indicate that the reconfiguration of the occupants' environment should be delayed or modified.

In one embodiment, the system 100 may determine one or more autonomous, semi-autonomous, or a combination thereof functions of the at least one vehicle in the at least one reconfiguration model. In one embodiment, the system 100 may analyze data, which may be available from various sources, about functions available in an ASA vehicle of the vehicle environment. For example, availability of the functions may be determined from the ASA vehicle system, a service provider associated with the ASA vehicle or its owner, registration information, or the like sources.

In one embodiment, the system 100 may cause, at least in part, a presentation of the one or more functions in the one or more notifications to the one or more users. In one embodiment, the system 100 may analyze the available vehicle functions and present the corresponding information to the appropriate occupants. For example, functions, features, or options associated with driving/control capabilities of the vehicle may be included in notifications presented to the driver of the vehicle, where functions, features, or options associated with an environment of the passengers may be included in notifications presented to one or more passengers.

In one embodiment, the system 100 may determine one or more unexpected activities associated with the one or more users. In one embodiment, the system 100 may analyze data from various sensors in the vehicle environment or UEs 101 to detect unexpected or unusual driver or passenger activities that do not match that of the current (e.g., reconfigured or original) vehicle environment. For example, a diver may attempt to take control of the vehicle while the reconfiguration model is in an autonomous mode. In another example, a passenger may attempt to reset the functionality of a video monitor for personal use while the reconfiguration model is set for a group viewing.

In one embodiment, the system 100 may cause, at least in part, a presentation of one or more other notifications, one or more user instructions, or a combination thereof to the one or more users. In various embodiments, the system 100 may determine and present proper notifications or instructions to the occupants of the vehicle environment, for example, via UEs 101 or devices/features in the vehicle environment. In one scenario, the notifications and instructions may be for the driver of the vehicle to take certain actions (e.g., release control, take control, etc.) related to control systems of the vehicle.

In one embodiment, the system 100 may initiate the reconfiguration of the at least one vehicle environment based, at least in part, on one or more responses from the one or more users to the one or more other notifications, the one or more user instructions, or a combination thereof. In one embodiment, the system 100 may initiate a reset of a reconfigured vehicle environment based on responses, or lack thereof, from the occupants in the vehicle environment. In one example, the system 100 may take control of the vehicle environment, and stop or suspend some/all of the functions of the vehicle environment until the occupants of the vehicle respond to some or all of the notifications or instructions.

In one embodiment, the system 100 may initiate a reconfiguration of a physical attribute of one or more features in the at least one vehicle environment based, at least in part, on one or more responses from the one or more users. In some examples, control systems of a vehicle environment may be moved or reconfigured to allow for other functions; certain surfaces (e.g., windows, windshield, floor, etc.) may be reconfigured for displaying video contents; raising certain parts of the floor to create working surfaces, or the like reconfigurations.

In one embodiment, the system 100 may cause, at least in part, a graphical representation of the at least one reconfiguration model in the one or more notifications to the one or more users. In various embodiments, one or more portions of a reconfiguration model may be presented to the occupants as a graphical representation via the UEs 101 or one or more display features in the vehicle environment. For example, the graphical representation may illustrate seating arrangements, video monitors, lighting options, ventilation outlets, or the like features.

In one embodiment, the system 100 may determine one or more user interactions with the graphical representation from the one or more users to configure one or more parameters of the at least one reconfiguration model. In various embodiments, the system 100 may determine and analyze interactions (e.g., accept, propose a change, etc.) of the occupants with a graphical representation of a reconfiguration model for configuring one or more parameters of the reconfiguration model.

As shown in FIG. 1, in one embodiment, the system 100 includes user equipment (UE) 101a-101n (also collectively referred to as a UE 101 and/or UEs 101), which may be utilized to execute one or more applications 103a-103n (also collectively referred to as applications 103) including navigation application, security applications, games, social networking, web browser, media application, user interface (UI), map application, web client, etc. to communicate with other UEs 101, one or more service providers 105a-105n (also collectively referred to as service provider/providers 105), one or more content providers 107a-107n (also collectively referred to as content provider/providers 107), a reconfiguration platform 109, one or more satellites 111a-111n (also collectively referred to as the satellite system 111), and/or with other components of a the system 100 directly and/or over a communication network 113.

In one embodiment, the UEs 101 may include data collection modules 115a-115n (also collectively referred to as DC module 115) for determining and/or collecting data associated with the UEs 101, the one or more sensors of the UE 101, the one or more users of the UEs 101, the applications 103, or the like information.

In one embodiment, the service providers 105 may include and/or have access to one or more service databases 117a-117n (also collectively referred to as service database 117), which may include various mapping data, user information, user profiles, user preferences, one or more profiles of one or more user devices (e.g., device configuration, sensors information, etc.), information on the service providers 105, and the like. In one embodiment, the service providers 105 may include one or more service providers offering one or more services, for example, location based services, navigation services, autonomous driving services, social networking services, content sharing, account management services, or a combination thereof.

In one embodiment, the content providers 107 may include and/or have access to one or more content database 119a-119n (also collectively referred to as content database 119), which may store, include, and/or have access to various content items. For example, the content providers 107 may store content items (e.g., at the content database 119) provided by various users, various service providers, crowd-sourced content, or the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

In various embodiments, the service providers 105 and/or the content providers 107 may include and/or have access to a geographic database 121, which may include information (e.g., POIs, objects, weather, people, etc.) associated with given geographical areas. The information may be available from various public, private, or government controlled databases, where the information may be requested or accessed by one or more entities of the system 100 via the communication network 113. In one embodiment, the system 100 includes an infrastructure for sharing geospatial information in real-time on multiple devices that includes a map-based service, application, and/or web interface that may provide various map UIs. By way of example, the map-based service, application, and/or interface can be provided over the communication network 113 by the service providers 105.

In one embodiment, the reconfiguration platform 109 may interface with or include a notification manager 123, wherein both elements may be implemented on-board a vehicle 125; for example, an automobile, a boat, a plane, train, or the like. Also, the reconfiguration platform 109 may be implemented as a standalone platform or as part of a service provide 105 for facilitating a reconfiguration of a vehicle environment. The reconfiguration platform 109 may discover and interact with one or more UEs 101 that may be within a vehicle environment. In one scenario, a reconfiguration platform 109 onboard a vehicle may discover one or more UEs 101 that may be in the vehicle and determine information from the UEs 101 associated with users of the UEs 101. Further, the reconfiguration platform 109 may interact with various sensors or systems in the vehicle and/or the UEs 101 for evaluating reconfiguration criteria associated with the vehicle and the occupants therein and determining a reconfiguration model for physical or functional aspects of the vehicle.

The notification manager 123 may interact with the reconfiguration platform 109 for generating and transmitting notifications and options, about a reconfiguration model for a vehicle environment, to UEs 101 and/or devices (e.g., a video monitor) in the vehicle. The users may utilize the UEs 101 and/or the devices in the vehicle to interact with the notifications or options presented thereon to provide one or more responses. In one embodiment, the notification manager 123 may determine types of the notifications and the devices in the vehicle environment to transmit the notifications to. For example, when a vehicle is traveling along a travel route, the notification manager 123 may determine that an audio notification may be more suitable so that a driver of the vehicle does not have to physically interact with his UE 101 or devices in the vehicle. Also, the notification manager 123 may detect audio feedback from the occupants in response to notifications presented in the vehicle environment.

In one embodiment, the reconfiguration platform 109 may be configured to interface directly with the service providers 105 for various map, location-based, and/or other related services. In addition, the reconfiguration platform 109 and/or the service providers 105 may interface with one or more content providers 107 that can provide/deliver content of various types and genres (e.g., geospatial information, mapping content, navigation content, travel content, locality content, marketing content) upon request. Requests may be initiated via the communication network 113 by way of one or more location based applications 103 executing on the UEs 101 that are further associated with respective users. By way of example, the applications 103 may access turn-by-turn navigation, routing information, maps, driving instructions, etc., for accessing, annotating, and/or sharing geospatial information. In one embodiment, the reconfiguration platform 109 can store and/or retrieve geospatial information, service information, and/or other related information in a geographic database 121 (further described below with respect to FIG. 2).

In one embodiment, the system 100 includes software to enhance the applications 103, the service providers 105, the content providers 107, the reconfiguration platform 109 and/or any other component of the system 100 to determine and present notifications and options to users for reconfiguring a vehicle environment of the users. It is contemplated that the reconfiguration and notification services need not be associated with a navigational route. Accordingly, in one embodiment, the system 100 can be used to provide entertainment and/or other services of relevance to a user in a vehicle environment. In one embodiment, the reconfiguration and notification service information may be saved on the participating users' UEs 101 or a vehicle's devices/systems. In one embodiment, other users may be able to access a user's route information, service information, estimated time of arrival, sharing information, location sharing information, speed sharing information, and other like user/vehicle service information. In one embodiment, the system 100 may automatically detect reconfiguration capabilities of a vehicle environment by, e.g., querying for device identifiers, user identifiers, etc. associated with a vehicle environment. Such information may be gathered as reconfiguration model information or to supplement preexisting information, and may further include service criticality information, route information, traffic information, weather information, estimated time of arrival sharing information, distance threshold information, and other like information.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as communication services (e.g., texting applications, calling applications, etc.), location-based service applications, navigation applications, camera/imaging application, media player applications, social networking applications, calendar applications, and the like. In one embodiment, one of the applications 103 at the UE 101 may act as a client for the reconfiguration platform 109. In one scenario, users are able to select a destination via one or more map applications.

By way of example, the reconfiguration platform 109 may include or interact with various sensors that may include a camera/imaging sensor for gathering image data, an audio recorder for gathering audio data, a global positioning sensor for gathering location data, a network detection sensor for detecting wireless signals or network data, temporal information and the like for use as annotations. In one embodiment, the sensors may include, light sensors, orientation sensors augmented with height sensor and acceleration sensor, tilt sensors, moisture sensors, pressure sensors, audio sensors (e.g., microphone), or receivers for different short-range communications (e.g., Bluetooth, Wi-Fi, etc.) In one scenario, the one or more sensors may detect attributes for mapping or routing (e.g., one or more modes of transportation).

The communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the components of the system 100 communicate with each other and other components using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
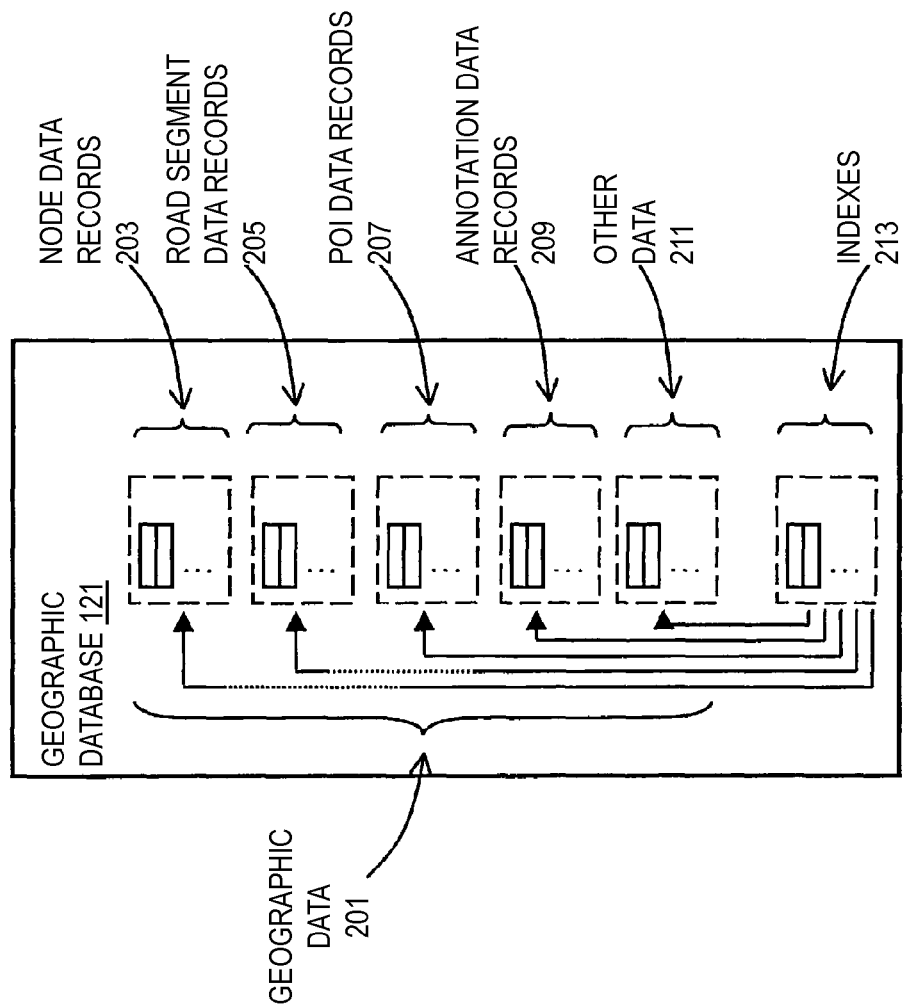
FIG. 2 is a diagram of a geographic database of the system 100, according to various embodiments.

FIG. 2 is a diagram of the geographic database of system 100, according to various embodiments. In the embodiments, notification and option information for reconfiguring an ASA vehicle environment can be stored, associated with, and/or linked to the geographic database 121 or data thereof. In one embodiment, the geographic or map database 121 includes geographic data 201 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 121 includes node data records 203, road segment or link data records 205, POI data records 207, annotation data records 209, other data records 211, for example, wherein an index 213 may provide additional information about the records/data. More, fewer or different data records can be provided. In one embodiment, the other data records 211 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 205 are links or segments representing roads, streets, or paths, as can be used in the calculated route or recorded route information to determine and present notifications and options to users for reconfiguring a vehicle environment of the users, according to exemplary embodiments. The node data records 203 are end points corresponding to the respective links or segments of the road segment data records 205. The road link data records 205 and the node data records 203 represent a road network, such as used by vehicles, cars, and/or other entities. Alternatively, the geographic database 121 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 121 can include data about the POIs and their respective locations in the POI data records 207. The geographic database 121 can also include data about places, such as cities, towns, or other communities, and other geographic features, such as bodies of water, mountain ranges, etc. Such place or feature data can be part of the POI data 207 or can be associated with POIs or POI data records 207 (such as a data point used for displaying or representing a position of a city).

The geographic database 121 can be maintained by the content providers 107 in association with the service providers 105 (e.g., a map developer). A map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 121 can be a master geographic database stored in a format that facilitates updating, maintenance, and development. For example, the master geographic database 121 or data in the master geographic database 121 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device (e.g., an ASA vehicle system) developer can perform compilation on a received geographic database in a delivery format to produce one or more compiled navigation databases.

As mentioned above, the geographic database 121 can be a master geographic database, but in alternate embodiments, the geographic database 121 can represent a compiled navigation database that can be used in or with end user devices (e.g., UEs 101, ASA vehicle system, etc.) to provide navigation-related functions. For example, the geographic database 121 can be used with the end user device 101 to provide an end user with navigation features. In such a case, the geographic database 121 can be downloaded or stored on the end user device or a UE 101, such as in applications 103, or the end user device or the UE 101 can access the geographic database 121 through a wireless or wired connection (such as via a server and/or the communication network 113), for example.

In one embodiment, the end user device or UE 101 may be an in-vehicle (e.g., ASA vehicle) navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for ranking of one or more road links.

Figure 3:
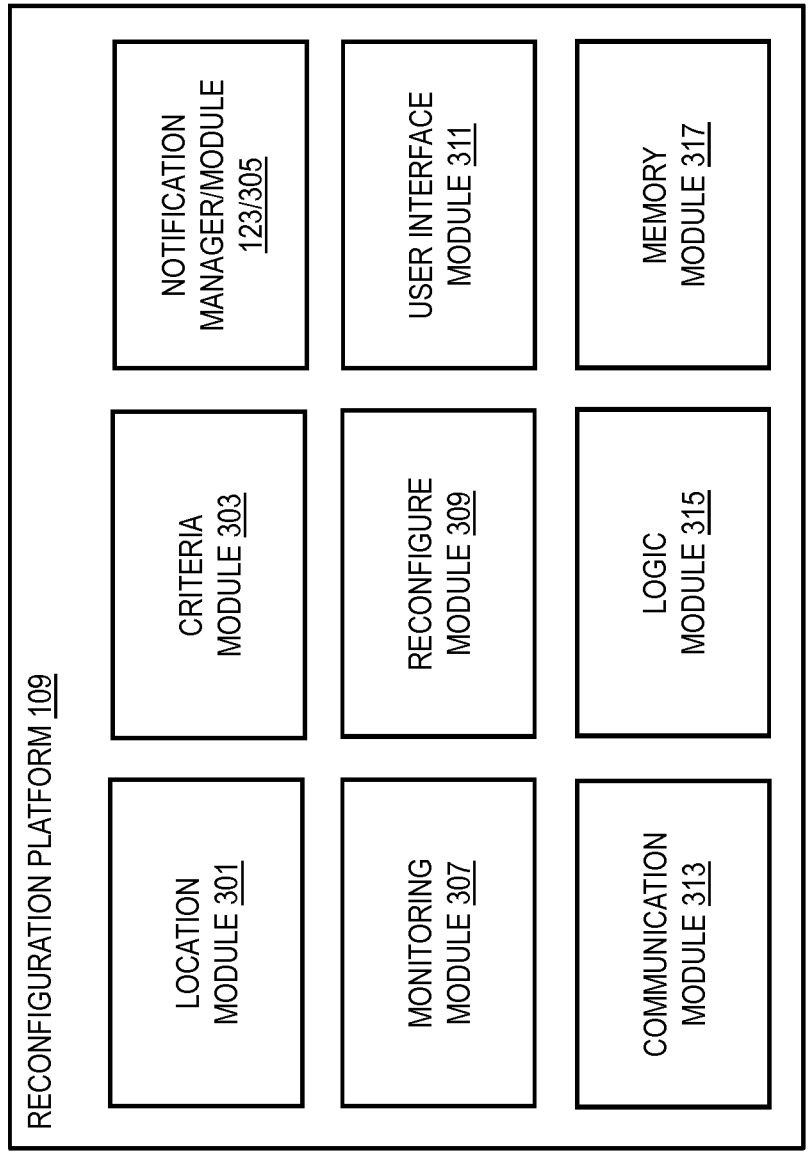
FIG. 3 is a diagram of the components of a reconfiguration platform, according to an embodiment.

FIG. 3 is a diagram of the components of a reconfiguration platform 109, according to one embodiment. By way of example, the reconfiguration platform 109 includes one or more components for determining and presenting notifications and options to users for reconfiguring a vehicle environment of the users. It is contemplated that the functions of these components may be combined in one or more components or performed by other components of equivalent functionality. In one embodiment, the reconfiguration platform 109 includes a location module 301, criteria module 303, notification manager 123/module 305, a monitoring module 307, a reconfigure module 309, a user interface module 311, a communication module 313, a logic module 315, a memory module 317 or a combination thereof.

In one embodiment, the location module 301 can determine location of a user, for example, via location information associated with a UE 101 or a user vehicle 125. The user's location can be determined by a wireless network triangulation system, GPS, assisted GPS (A-GPS), Cell of Origin, or other location extrapolation technologies. Standard GPS and A-GPS systems can use satellites 111 to pinpoint the location of a UE 101 or a vehicle 125. A Cell of Origin system can be used to determine the cellular tower that a cellular UE 101/vehicle 125 is synchronized with. This information provides a coarse location of the UE 101/vehicle 125 because the cellular tower can have a unique cellular identifier (cell-ID) that can be geographically mapped. The location module 301 may also utilize multiple technologies to detect the location of the UE 101/vehicle 125. Location coordinates (e.g., GPS coordinates) can give finer detail as to the location of the UE 101/vehicle 125 when media is captured. In one embodiment, GPS coordinates are stored as context information in the memory module 317 and are available to the reconfiguration platform 109, notification manager 123, service providers 105, or to other entities of the system 100 (e.g., via the communication module 313). Moreover, in certain embodiments, the GPS coordinates can include an altitude to provide a height. In other embodiments, the altitude can be determined using another type of altimeter.

In one embodiment, the criteria module 303 may utilize various algorithms and software for determining reconfiguration criteria that may be based on information associated with a location of the vehicle environment (e.g., near a city center, a mountainous area, a freeway, moving, stationary, etc.), physical features and characteristics (e.g., interior and exterior) of a vehicle in a vehicle environment, parameters predefined by the owner/driver of the vehicle, characteristics of the occupants in the vehicle environment, or the like information. For example, the criteria module 303 may determine presence of some occupants in an ASA vehicle, capabilities of the ASA vehicle, location of the ASA vehicle, predefined criteria for a reconfiguration of the ASA vehicle, ASA vehicle regulations at the current location, or the like information that may assist in determining whether to initiate a reconfiguration.

In one embodiment, the notification manager 123 may be implemented as a notification module 305, wherein either implementation can facilitate functionalities for managing notifications and options for reconfiguring a vehicle environment. In one embodiment, the notification module 305 may cause a presentation of one or more notifications about a reconfiguration model to one or more users in a vehicle environment. The notifications may include information about reconfigurations of physical and/or functional features of a vehicle environment, wherein the reconfiguration may affect some or all occupants in the vehicle environment. In one embodiment, the notifications may include prompts to the occupants to select from one or more options in the reconfiguration model that may affect the vehicle environment and the occupants therein. In various scenarios, the notifications may include audio, visual or haptic alerts.

In one embodiment, the monitoring module 307 may include algorithms to interface with and/or process user responses or data from sensors in a vehicle environment. In one embodiment, the monitoring module 307 may determine one or more responses from the one or more users in response to the presentation of the notifications. For example, monitoring module 307 may receive one or more inputs/selections from the occupants in response to the notifications and options associated with the reconfiguration model for the vehicle environment of the occupants. For example, the driver may select to delay all or parts of a proposed reconfiguration of his ASA vehicle environment. Additionally, the monitoring module 307 may monitor various sensors in the vehicle environment to detect any obstructions in reconfiguring a component or device (e.g., seats, doors, floor sections, etc.) in the vehicle environment.

In one embodiment, the reconfigure module 309 may interface with various devices, systems, sensors, actuators or the like components in a vehicle to initiate the reconfiguration of various elements, components, features, functions in a vehicle environment. In one embodiment, the reconfigure module 309 may initiate the reconfiguration of all or portions of the vehicle environment. The reconfigure module 309 may reset one or more portions of a vehicle environment to an original configuration, wherein information for a reconfiguration model may be stored at or retrieved from the memory module 317. The reconfigure module 309 may interact with the monitoring module 307 and the notification module 305 to determine when and what in a vehicle environment to reconfigure.

In one embodiment, the user interface module 311 may be configured for exchanging information between the reconfiguration platform 109, service providers 105, UEs 101, or other elements of the system 100. In another embodiment, the user interface module 311 enables presentation of a graphical user interface (GUI) for displaying a presentation of one or more notifications or options to the one or more users. For example, the user interface module 311 executes a GUI application configured to provide users with notifications, options, and other information related to reconfiguration of a vehicle environment. The user interface module 311 employs various application programming interfaces (APIs) or other function calls corresponding to the UE 101 or other devices in a vehicle environment 125, thus enabling the display of graphics primitives such as menus, buttons, data entry fields, etc., for generating the user interface elements. Still further, the user interface module 311 may be configured to operate in connection with augmented reality (AR) or virtual reality (VR) processing techniques, wherein various applications, graphic elements and features may interact. For example, the user interface module 311 may coordinate the presentation of notifications or information for reconfiguring a vehicle environment.

In one embodiment, the communication module 313 may be used for communication between various elements of the system 100 as well as between modules, elements, components, etc. of the reconfiguration platform 109. For example, the communication module 313 may be used to communicate commands, requests, data, etc., to/from the applications 103, the service providers 105, or the like.

In one embodiment, the logic module 315 may manage tasks, including tasks performed by the other modules. For example, although the other modules may perform their actual tasks, the logic module 315 may determine when and how those tasks are performed or otherwise direct the other modules to perform the task. In one embodiment, the logic module 315 may determine to process the one or more location traces in substantially real-time, batch mode, according to a schedule, or a combination thereof. By way of example, the schedule may be based, at least in part, on computational resources, amount of available data, etc.

Figure 4:
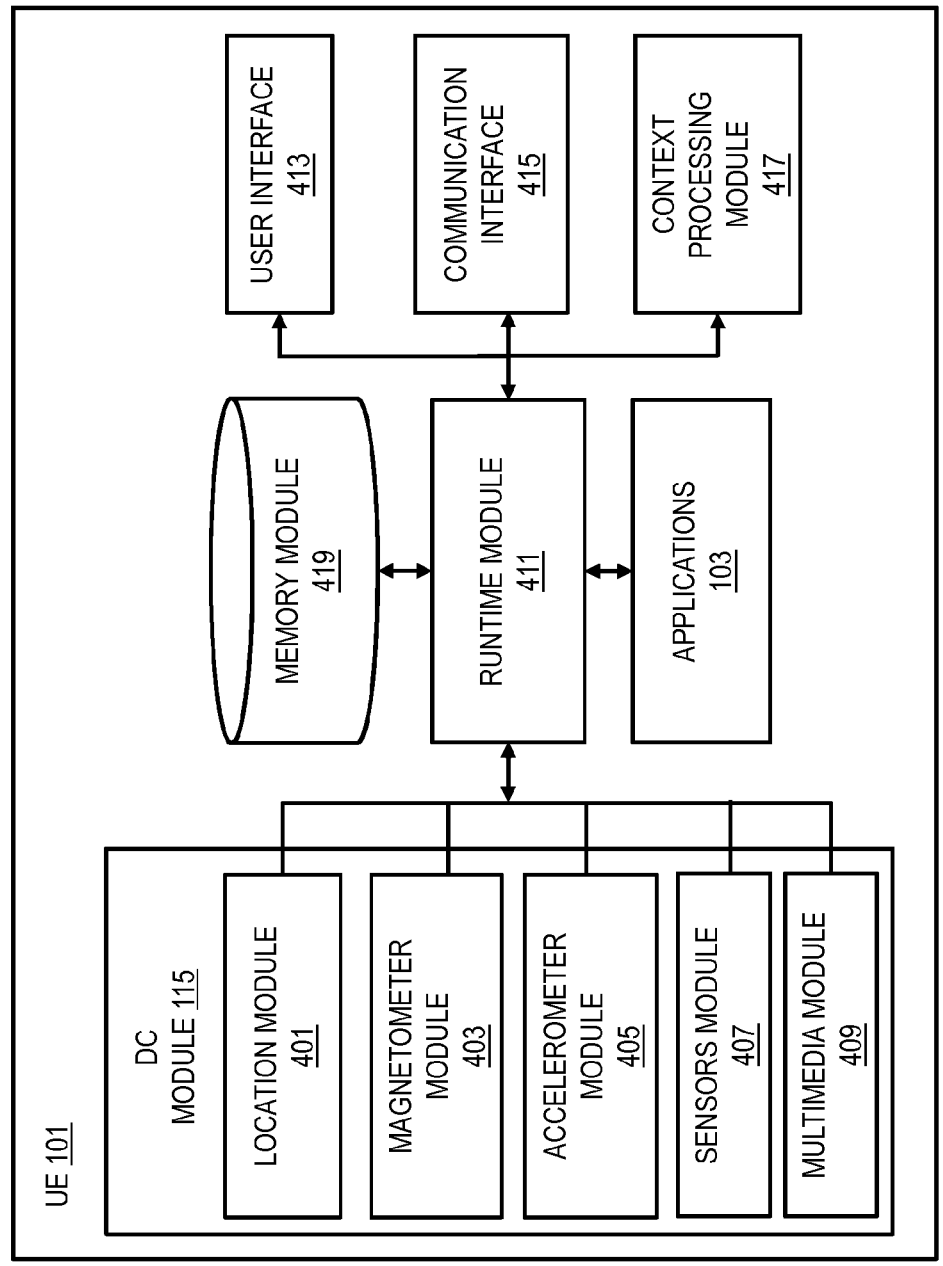
FIG. 4 is a diagram of the components of a user equipment, according to an embodiment.
Figure 5:
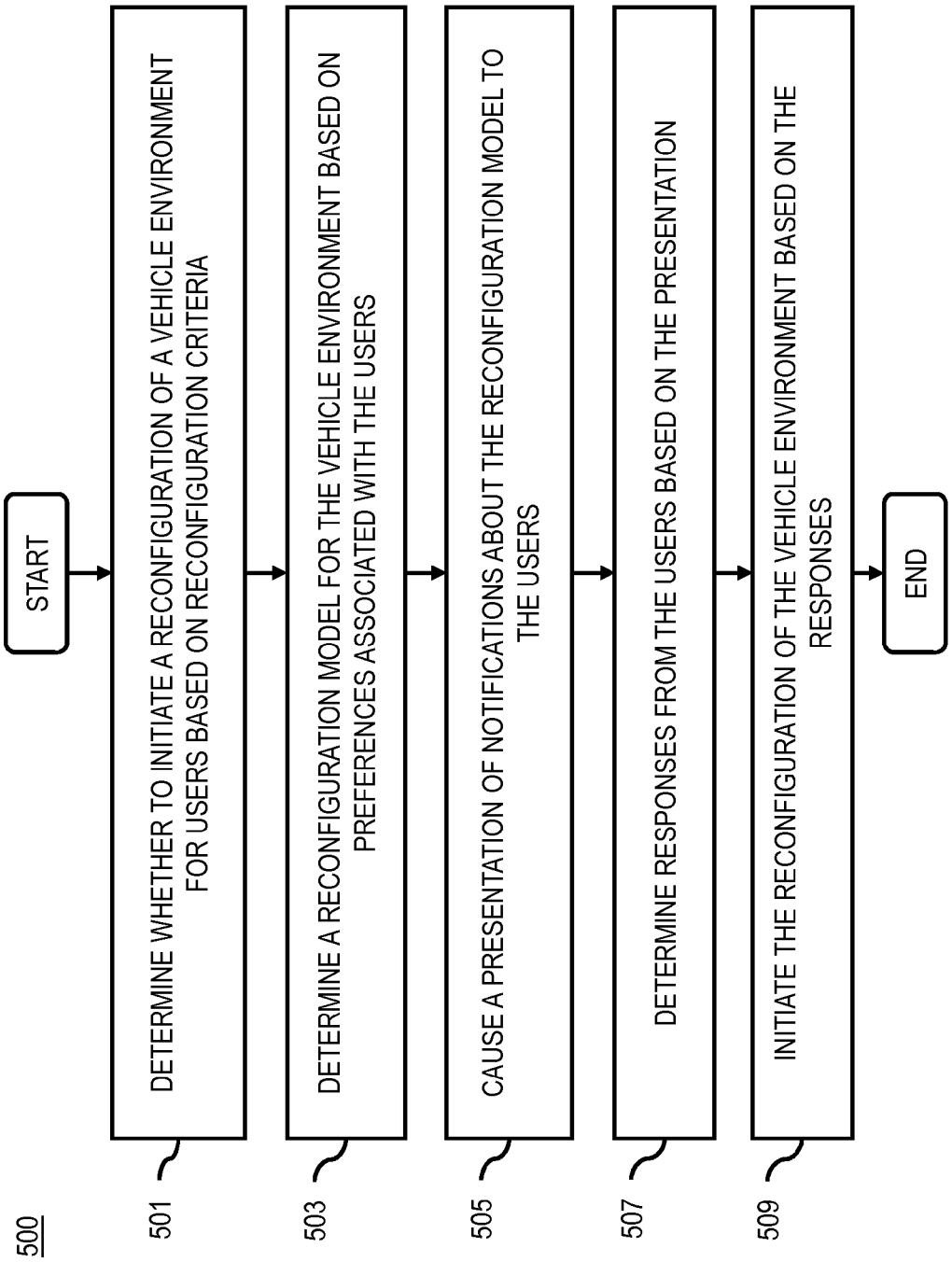
FIGS. 5 through 9 illustrate flowcharts of various processes for determining and presenting notifications and options to users for reconfiguring a vehicle environment of the users, according to various embodiments.
Figure 6:
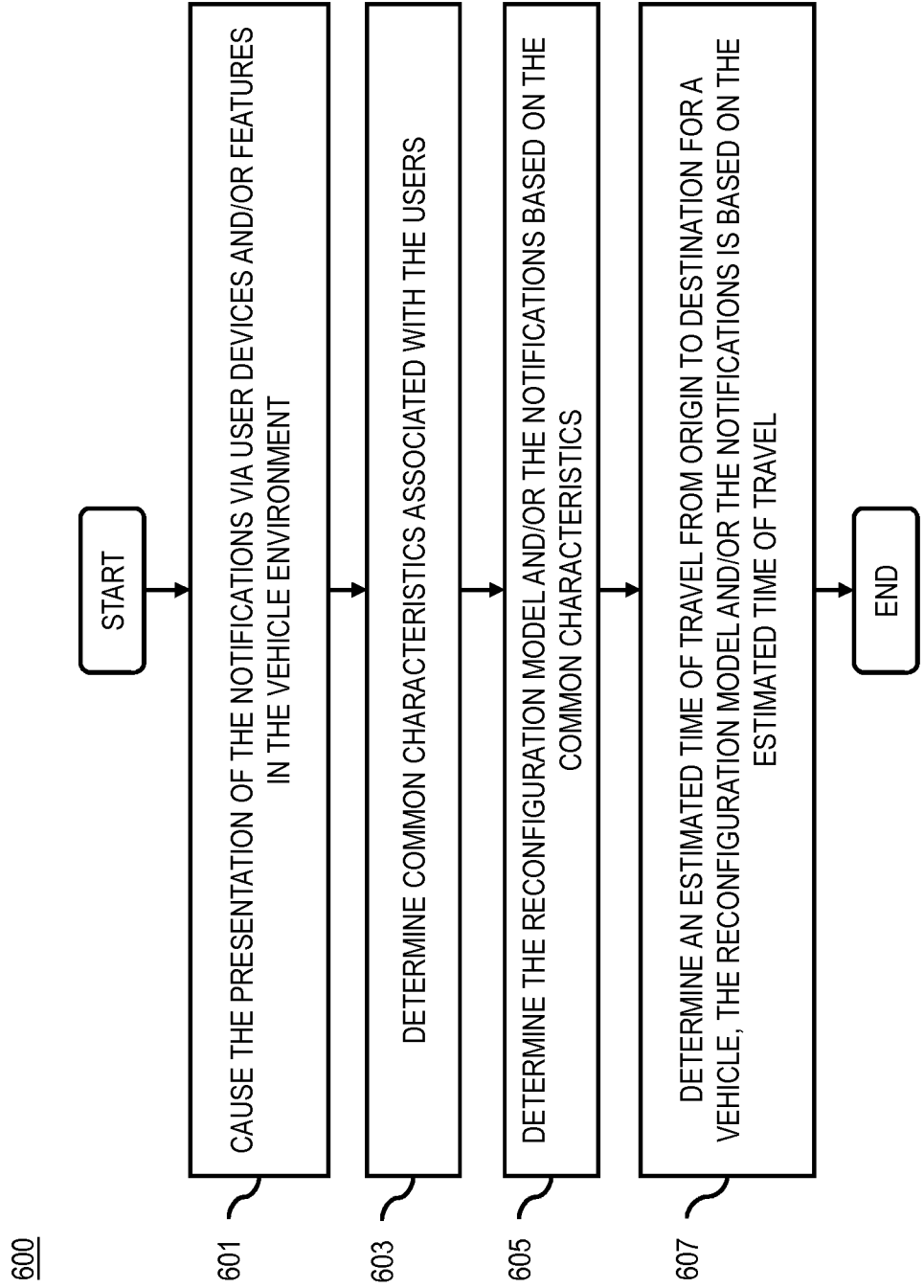
Figure 7:
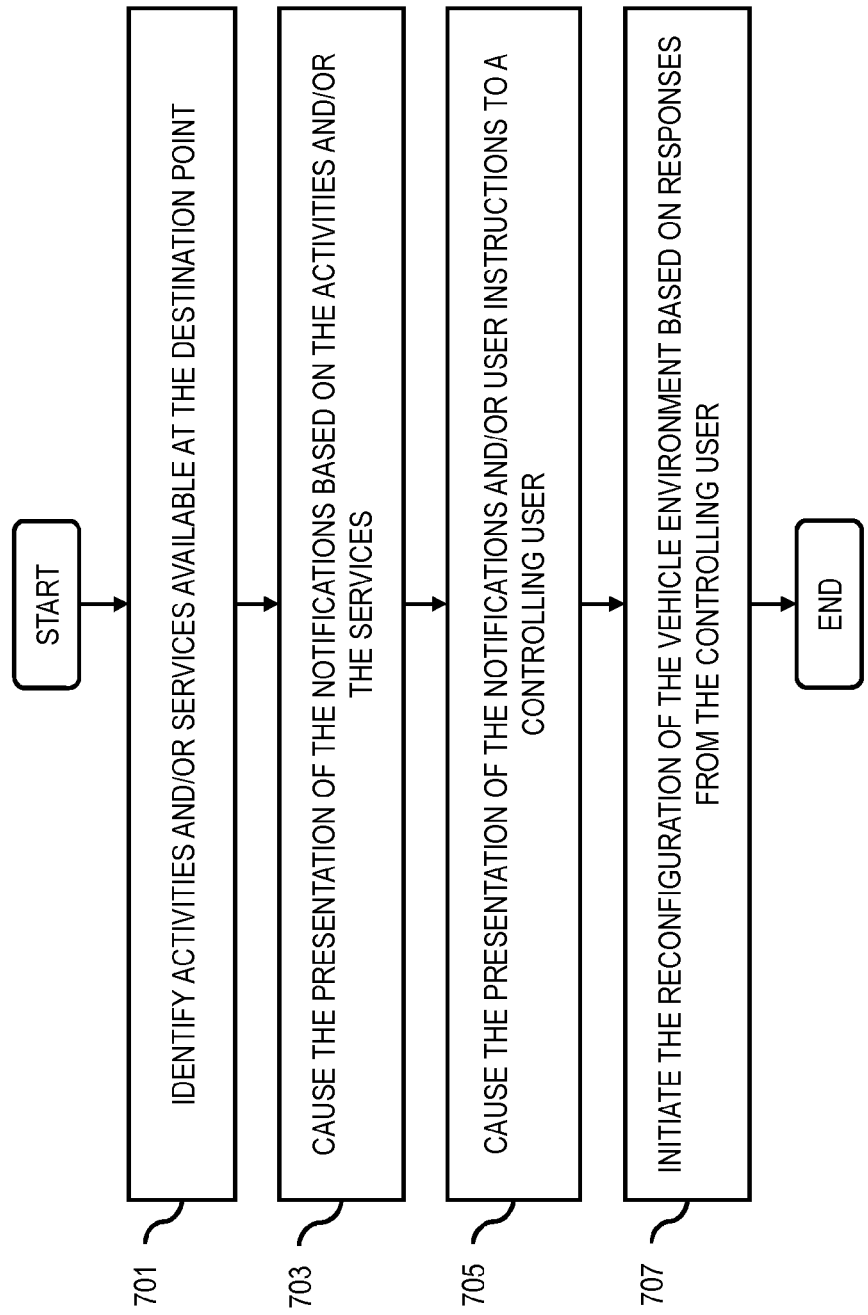
Figure 8:
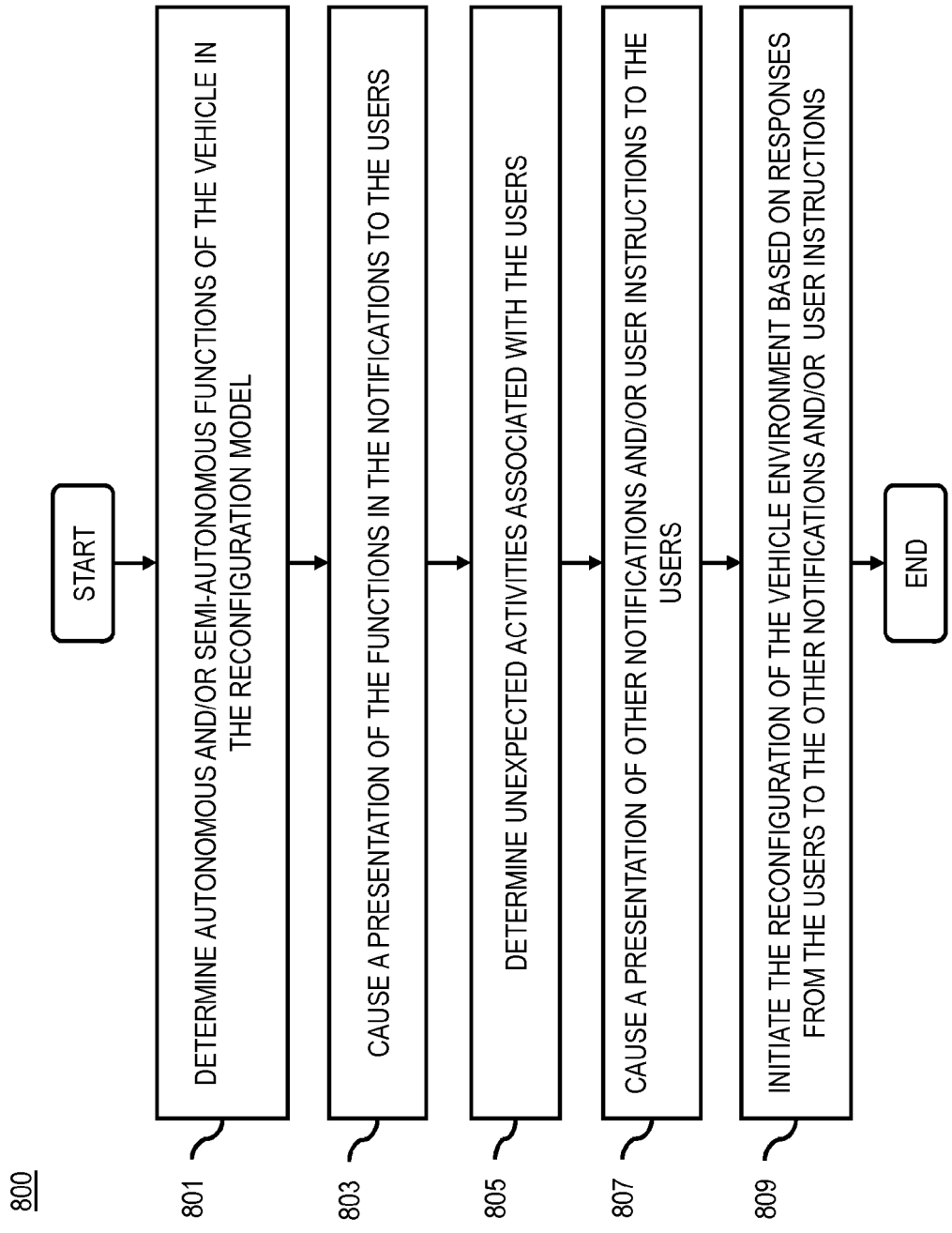
Figure 9:
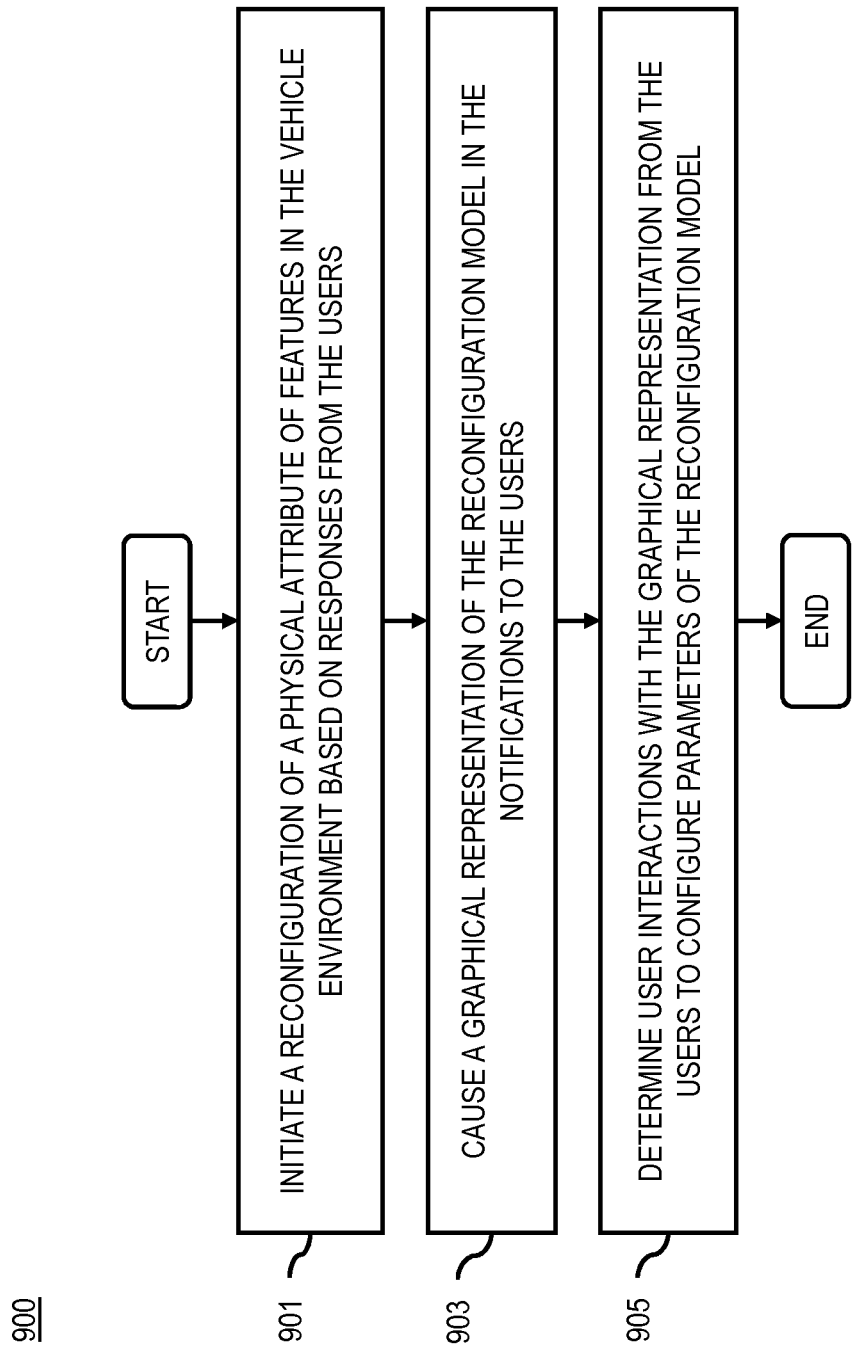

FIG. 4 is a diagram of the components of a user equipment capable of communicating with a reconfiguration platform for facilitating a reconfiguration of a user vehicle environment, according to an embodiment. By way of example, a UE 101 includes one or more components for receiving and transmitting communication information including reconfiguration notifications/options, text messages, location information, sensor information, and the like. It is contemplated that the functions of these components may be combined in one or more components or performed by other components of equivalent functionality. In this embodiment, the UE 101 includes a DC module 115 that may include one or more location modules 401, magnetometer modules 403, accelerometer modules 405, sensors module 407, and multimedia modules 409. Further, the UE 101 may also include a runtime module 411 to coordinate the use of other components of the UE 101, a user interface 413, a communication interface 415, a context processing module 417, and a memory module 419. The applications 103 may execute on the runtime module 411 utilizing the components of the UE 101.

The location module 401 can determine location of a user, for example, via location information associated with a UE 101 of the user. The user's location can be determined by a wireless network triangulation system, GPS, assisted GPS (A-GPS), Cell of Origin, or other location extrapolation technologies. Standard GPS and A-GPS systems can use satellites 111 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 401 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 419 and are available to the context processing module 417, DC module 115, the service providers 105, or to other entities of the system 100 (e.g., via the communication interface 415). Moreover, in certain embodiments, the GPS coordinates can include an altitude to provide a height. In other embodiments, the altitude can be determined using another type of altimeter. In certain embodiments, the location module 401 can be a means for determining a location of the UE 101, an image, or used to associate an object in view with a location.

The magnetometer module 403 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 419, made available to other modules and/or applications 103 of the UE 101, and/or transmitted via the communication interface 415 to one or more entities of the system 100.

The accelerometer module 405 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 405 can determine the angle the UE 101 is pointed as compared to Earth's gravity. In certain embodiments, the magnetometer module 403 and accelerometer module 405 can be means for ascertaining a perspective of a user. This perspective information may be stored in the memory module 419, made available to other modules and/or applications 103 of the UE 101, and/or sent to one or more entities of the system 100.

In various embodiments, the sensors module 407 can process sensor data from various sensors (e.g., GPS, accelerometer, gyroscope, thermometer, etc.) to determine environmental (e.g., atmospheric) conditions surrounding the UE 101, user mood (e.g., hungry, angry, tired, etc.), location information, and various other information from a range sensors that may be available on one or more devices. For example, the sensors module 407 may detect conditions including humidity, temperature, geo-location, biometric data of the user, etc. Once again, this information can be stored in the memory module 419 and sent to the reconfiguration platform 109 and/or to other entities of the system 100. In certain embodiments, information collected from the DC module 115 can be retrieved by the runtime module 411 and stored in the memory module 419, made available to other modules and/or applications 103 of the UE 101, or sent to one or more entities of the system 100, for example, the reconfiguration platform 109. Additionally, the sensors module 407 may have access to the sensor information from an ASA vehicle.

In one embodiment, the multimedia module 409 may be utilized to capture various media items, for example, graphical encoded data representations, images, video, audio, and the like, wherein the captured media may be submitted to one or more modules and applications of the UE 101, a service provider, and/or a content provider for further processing, storage, sharing, and the like. For example, a captured image of graphical encoded data representations may be submitted to a service provider and/or the reconfiguration platform 109 for analysis and/or decoding. In one embodiment, the multimedia module 409 may also be utilized to process various media items for determining location information associated with a media content item. For example, a media item may be a picture that may include images of people, POIs, objects, buildings, etc. In one embodiment, the multimedia module 409 may use one or more image processing algorithms for processing a media item and for identifying one or more elements present into media item.

The user interface 413 can include various methods of communication. For example, the user interface 413 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

In one embodiment, the communication interface 415 can be used to communicate with one or more entities of the system 100. Certain communications can be via methods such as an internet protocol, messaging (e.g., SMS, MMS, etc.), or any other communication method (e.g., via the communication network 113). In some examples, the UE 101 can send context information associated with the UE 101 to the service providers 105, content providers 107, reconfiguration platform 109, or to other entities of the system 100.

The context processing module 417 may be utilized in determining context information from the DC module 115 or applications 103 executing on the runtime module 225. This information may be caused to be transmitted, via the communication interface 415, to the reconfiguration platform 109, service providers 105 or to other entities of the system 100. The context processing module 417 may additionally be utilized as a means for determining information related to the user, an instance of data, a value, a content item, an object, a subject, and the like. In certain embodiments, the context processing module 417 can infer higher level context information from the context data such as favorite locations, significant places, common activities, interests in products and services, POIs at various geo-locations, etc.

Figure 12:
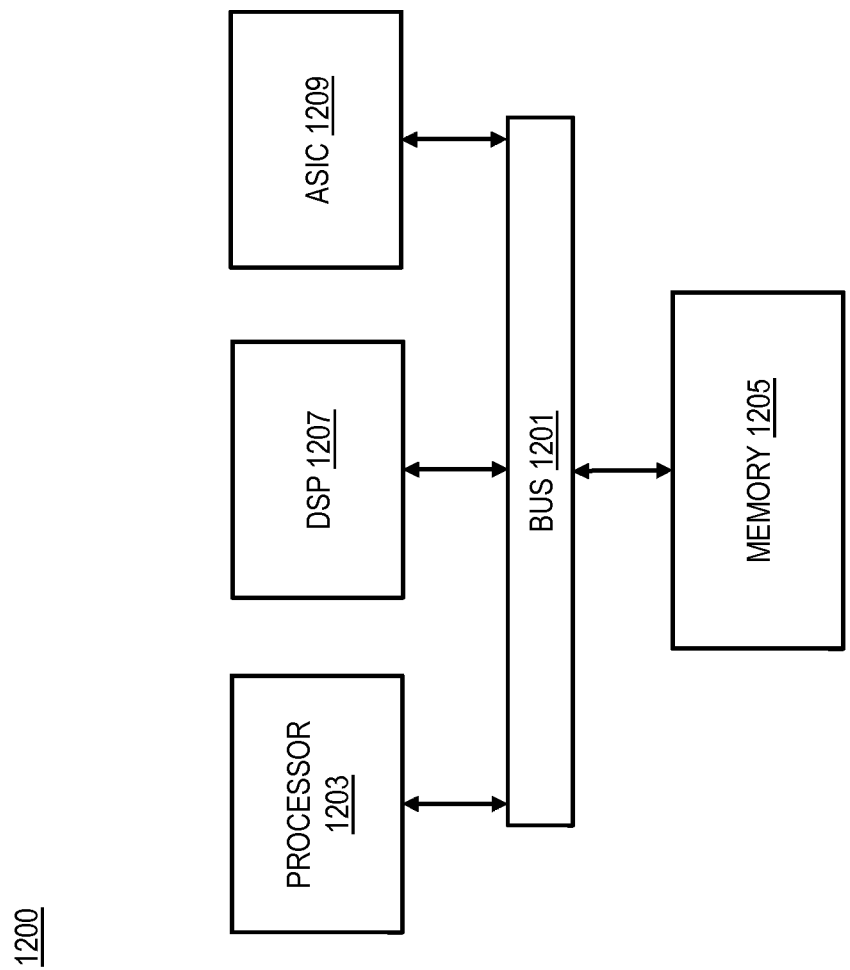
FIG. 12 is a diagram of a chip set that can be used to implement an embodiment of the invention.

FIGS. 5 through 9 illustrate flowcharts of various processes for, at least, determining and presenting notifications and options to users for reconfiguring a vehicle environment of the users, according to various embodiments. In various embodiments, reconfiguration platform 109 may perform one or more portions of the processes 500 through 900 which may be implemented in, for instance, a chip set including a processor and a memory as shown in FIG. 12. As such, the reconfiguration platform 109 can provide means for accomplishing various parts of the process 500 through 900 as well as means for accomplishing other processes in conjunction with other components of the system 100. Throughout these processes, reconfiguration platform 109 may be referred to as completing various portions of the processes 500 through 900, however, it is understood that other components of the system 100 can perform some of and/or all of the process steps. Further, for clarity in discussing the processes 500 through 900, the reconfiguration platform 109 is referred to as completing various steps of said processes; however, said processes and/or example steps described therein may be performed in any suitable order and/or may be optional.

The process 500 may begin at step 501, where the reconfiguration platform 109 may determine whether to initiate a reconfiguration of at least one vehicle environment for one or more users based, at least in part, on one or more reconfiguration criteria. In various embodiments, the reconfiguration criteria may be based on information associated with a location of the vehicle environment (e.g., near a city center, a mountainous area, a freeway, moving, stationary, etc.), physical features and characteristics (e.g., interior and exterior) of a vehicle in a vehicle environment, parameters predefined by the owner/driver of the vehicle, characteristics of the occupants in the vehicle environment, or the like information. For example, a reconfiguration platform 109 in the vehicle environment or at a service provider 105 may determine presence of some occupants in an ASA vehicle, capabilities of the ASA vehicle, location of the ASA vehicle, predefined criteria for a reconfiguration of the ASA vehicle, ASA vehicle regulations at the current location, or the like information that may assist in determining whether to initiate a reconfiguration.

In step 503, the reconfiguration platform 109 may determine at least one reconfiguration model for the at least one vehicle environment based, at least in part, on one or more preferences associated with the one or more users. In various embodiments, user preferences from a previous reconfiguration model, user devices of the occupants in the vehicle environment, information available from service providers associated with the occupants, or the like information indicative of user preferences for reconfiguring a vehicle environment. For example, a reconfiguration model may include reconfiguring seating arrangements, control panels, video monitors, popup tables, windows, floor space, or the like features in an ASA vehicle.

In step 505, the reconfiguration platform 109 may cause, at least in part, a presentation of one or more notifications about the at least one reconfiguration model to the one or more users. In one embodiment, the notifications may include information about reconfigurations of physical and/or functional features of a vehicle environment, wherein the reconfiguration may affect some or all occupants in the vehicle environment. In one embodiment, the notifications may include prompts to the occupants to select from one or more options in the reconfiguration model that may affect the vehicle environment and the occupants therein. In various scenarios, the notifications may include audio, visual or haptic alerts.

In step 507, the reconfiguration platform 109 may determine one or more responses from the one or more users based, at least in part, on the presentation. In one embodiment, the reconfiguration platform may receive one or more inputs/selections from the occupants in response to the notifications and options associated with the reconfiguration model for the vehicle environment of the occupants. For example, the driver may select to delay all or parts of a proposed reconfiguration of his ASA vehicle environment.

In step 509, the reconfiguration platform 109 may initiate the reconfiguration of the at least one vehicle environment based, at least in part, on the one or more responses. In one embodiment, the reconfiguration platform may initiate the reconfiguration of all or portions of the vehicle environment based on the responses/selections received from the occupants in the vehicle environment. For example, the selections may indicate that passenger environments may be reconfigured now, but reconfiguration of the driver's environment is to be delayed for some time. In some instances, the responses may indicate one or more proposed changes to the reconfiguration model, wherein the reconfiguration platform 109 may evaluate the proposed changes and accordingly provide additional notifications and options.

The process 600 may begin at step 601, where the reconfiguration platform 109 may cause, at least in part, the presentation of the one or more notifications via one or more user devices, one or more features in the at least one vehicle environment, or a combination thereof. In various embodiments, the notifications, options and any related information may be presented to the occupants in the vehicle environment via user devices (e.g., mobile phones, tablets, laptop computers, etc.) and/or devices available in the vehicle environment, for example, any audio (e.g., speakers) or visual (e.g., video monitors, lights, etc.) components in the vehicle. In one embodiment, the reconfiguration platform 109 may temporarily reconfigure a device in the vehicle environment for presentation of the notifications to the occupants therein.

In step 603, the reconfiguration platform 109 may determine one or more common characteristics associated with the one or more users. In various embodiments, the reconfiguration platform may analyze information available about the occupants in the vehicle environment to determine one or more common characteristics, elements, purpose, or the like information indicative of the occupants' purpose for being in the vehicle environment. For example, the analysis may indicate that the occupants in the vehicle are family members traveling to a vacation destination, or that the occupants are college friends on a road trip, or that the occupants are members of a sports team traveling to a sports event, or the like.

In step 605, the reconfiguration platform 109 may determine the at least one reconfiguration model, the one or more notifications or a combination thereof based, at least in part, on the one or more common characteristics. For example, the reconfiguration model may be based on the common characteristic that the occupants are students traveling to an examination facility (e.g., a college), where the reconfiguration model may provide an environment for individual or group studies. In another example, the occupants may be children traveling to a summer camp, where the reconfiguration of the vehicle environment may provide video monitors or projector surfaces for displaying content about their camp and upcoming activities, wherein their seating arrangement may be reconfigured for optimal viewing position and resting posture. In one embodiment, the notifications and options about the reconfiguration model may be presented to one or more occupants based on the common characteristics of the occupants, where the notifications may be presented to one occupant for majority of the reconfiguration options and to the rest for certain options associated with each occupant (e.g., position of their seats).

In step 607, the reconfiguration platform 109 may determine an estimated time of travel information from an origin point to a destination point for at least one vehicle associated with the at least one vehicle environment, wherein the at least one reconfiguration model for the at least one vehicle environment, the one or more notifications, or a combination thereof is based, at least in part, on the estimated time of travel. In various embodiments, the reconfiguration model may be based on a travel time from an origin to a destination point where, for example, a reconfiguration model may be suitable for a vehicle environment for a certain period of time. For example, reconfiguration of a vehicle environment for the occupants to rest and watch a movie may be suitable if the occupants can remain in the vehicle environment for a certain period of time (e.g., two hours). In another embodiment, the reconfiguration platform may determine a threshold for a remaining time to a destination point and once the threshold is met, the reconfiguration platform may present one or more notifications to the occupants about resetting the reconfigured vehicle environment to its original configuration. In one embodiment, a reconfiguration model may have a plurality of portions that may be implemented at different times or points of a travel route. For example, the reconfiguration model may begin with a rest environment, next a refreshments environment, then a personal care environment, or the like environments.

The process 700 may begin at step 701, where the reconfiguration platform 109 may identify one or more activities, one or more services, or a combination thereof available at the destination point. In various embodiments, the reconfiguration platform 109 may analyze information (e.g., travel itinerary of occupants, destination POI, etc.) associated with the occupants of the vehicle environment for determining activities or services that the occupants may be associated with or have an interest in. For example, at the destination point, the occupants may be able to dine, shop, prepare for a business meeting, shower or the like.

In step 703, the reconfiguration platform 109 may cause, at least in part, the presentation of the one or more notifications based, at least in part, on the one or more activities, the one or more services, or a combination thereof. In one embodiment, the notifications may be based on an anticipated amount of time that the occupants may need to prepare for the activities or services. In one embodiment, responses received from the occupants may indicate an interest in the activities or the services, wherein the reconfiguration platform may update or initiate the reconfiguration model for all or some of the occupants based on their responses.

In step 705, the reconfiguration platform 109 may cause, at least in part, the presentation of the one or more notifications, one or more user instructions, or a combination thereof to at least one controlling user. In one embodiment, one or more occupants may be identified as a controlling occupant, e.g., a driver, a coach, a parent, a guide, etc., who may be presented with the notifications and options about the reconfiguration model for the vehicle environment. In one scenario, notifications and options related to certain functions of a vehicle in the vehicle environment may be presented only to a driver of the vehicle, and notifications and options for environments of the passengers may be presented to a parent, a coach, a guide, or the like who is associated with the passengers.

In step 707, the reconfiguration platform 109 may initiate the reconfiguration of the at least one vehicle environment based, at least in part, on one or more responses from the at least one controlling user. In one embodiment, the reconfiguration platform 109 may request, receive, and analyze one or more responses from one or more controlling users/occupants for initiating reconfiguration of all or some of the vehicle environment. For example, a response from the driver of the vehicle may indicate that driver environment may be reconfigured whereas a response from a coach may indicate that the reconfiguration of the occupants' environment should be delayed or modified.

The process 800 may begin at step 801, where the reconfiguration platform 109 may determine one or more autonomous, semi-autonomous, or a combination thereof functions of the at least one vehicle in the at least one reconfiguration model. In one embodiment, the reconfiguration platform 109 may analyze data, which may be available from various sources, about functions available in an ASA vehicle of the vehicle environment. For example, availability of the functions may be determined from the ASA vehicle system, a service provider associated with the ASA vehicle or its owner, registration information, or the like sources.

In step 803, the reconfiguration platform 109 may cause, at least in part, a presentation of the one or more functions in the one or more notifications to the one or more users. In one embodiment, the reconfiguration platform 109 may analyze the available vehicle functions and present the corresponding information to the appropriate occupants. For example, functions, features, or options associated with driving/control capabilities of the vehicle may be included in notifications presented to the driver of the vehicle, where functions, features, or options associated with an environment of the passengers may be included in notifications presented to one or more passengers.

In step 805, the reconfiguration platform 109 may determine one or more unexpected activities associated with the one or more users. In one embodiment, the reconfiguration platform 109 may analyze data from various sensors in the vehicle environment or UEs 101 to detect unexpected or unusual driver or passenger activities that do not match that of the current (e.g., reconfigured or original) vehicle environment. For example, a diver may attempt to take control of the vehicle while the reconfiguration model is in an autonomous mode. In another example, a passenger may attempt to reset the functionality of a video monitor for personal use while the reconfiguration model is set for a group viewing.

In step 807, the reconfiguration platform 109 may cause, at least in part, a presentation of one or more other notifications, one or more user instructions, or a combination thereof to the one or more users. In various embodiments, the reconfiguration platform 109 may determine and present proper notifications or instructions to the occupants of the vehicle environment, for example, via UEs 101 or devices/features in the vehicle environment. In one scenario, the notifications and instructions may be for the driver of the vehicle to take certain actions (e.g., release control, take control, etc.) related to control systems of the vehicle.

In step 809, the reconfiguration platform 109 may initiate the reconfiguration of the at least one vehicle environment based, at least in part, on one or more responses from the one or more users to the one or more other notifications, the one or more user instructions, or a combination thereof. In one embodiment, the reconfiguration platform 109 may initiate a reset of a reconfigured vehicle environment based on responses, or lack thereof, from the occupants in the vehicle environment. In one example, the reconfiguration platform 109 may take control of the vehicle environment, and stop or suspend some/all of the functions of the vehicle environment until the occupants of the vehicle respond to some or all of the notifications or instructions.

The process 900 may begin at step 901, where the reconfiguration platform 109 may initiate a reconfiguration of a physical attribute of one or more features in the at least one vehicle environment based, at least in part, on one or more responses from the one or more users. In some examples, control systems of a vehicle environment may be moved or reconfigured to allow for other functions; certain surfaces (e.g., windows, windshield, floor, etc.) may be reconfigured for displaying video contents; raising certain parts of the floor to create working surfaces, or the like reconfigurations.

In step 903, the reconfiguration platform 109 may cause, at least in part, a graphical representation of the at least one reconfiguration model in the one or more notifications to the one or more users. In various embodiments, one or more portions of a reconfiguration model may be presented to the occupants as a graphical representation via the UEs 101 or one or more display features in the vehicle environment. For example, the graphical representation may illustrate seating arrangements, video monitors, lighting options, ventilation outlets, or the like features.

In step 905, the reconfiguration platform 109 may determine one or more user interactions with the graphical representation from the one or more users to configure one or more parameters of the at least one reconfiguration model. In various embodiments, the reconfiguration platform 109 may determine and analyze interactions (e.g., accept, propose a change, etc.) of the occupants with a graphical representation of a reconfiguration model for configuring one or more parameters of the reconfiguration model.

FIGS. 10A through 10D illustrate user interface diagrams for notifications on reconfiguring a vehicle environment, according to various embodiments.

Figure 10A:
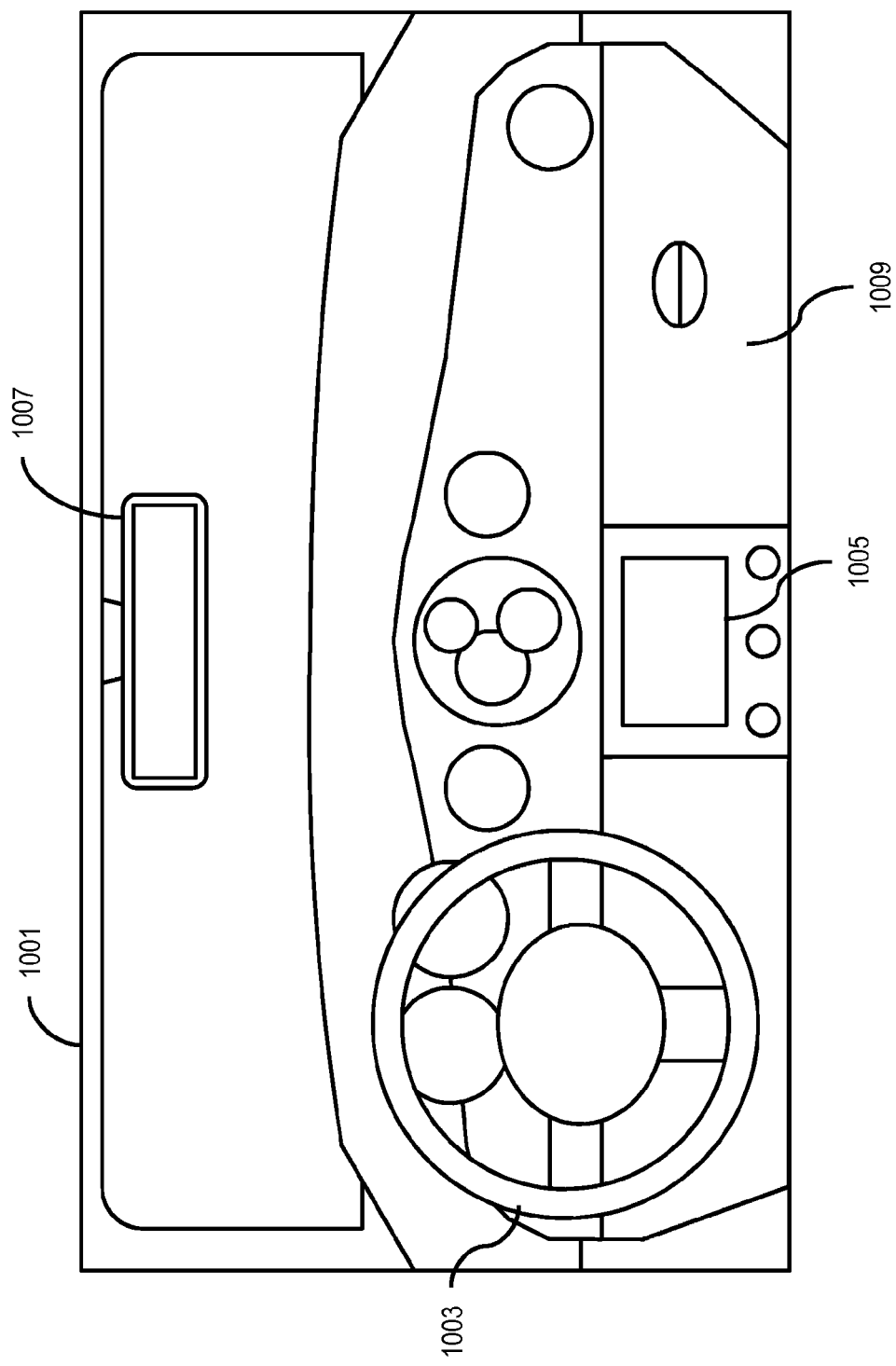
FIGS. 10A through 10D illustrate user interface diagrams for notifications on reconfiguring a vehicle environment, according to various embodiments.

FIG. 10A illustrates an instrument panel 1001 of a vehicle where one or more features of the panel may be physically or functionally reconfigured to a different position or for a different functionality. For example, the steering control 1003 may be moved to a different position (e.g., for more space near the panel) while the ASA control system is controlling the vehicle guidance system. Also, a display monitor 1005 may be reconfigured to present various notifications and messages. A rear-view mirror 1007 may also be reconfigured for displaying media content and notifications. A compartment door 1009 may be reconfigured to function as a mini table/desk for use by an occupant near the front of the vehicle.

Figure 10B:
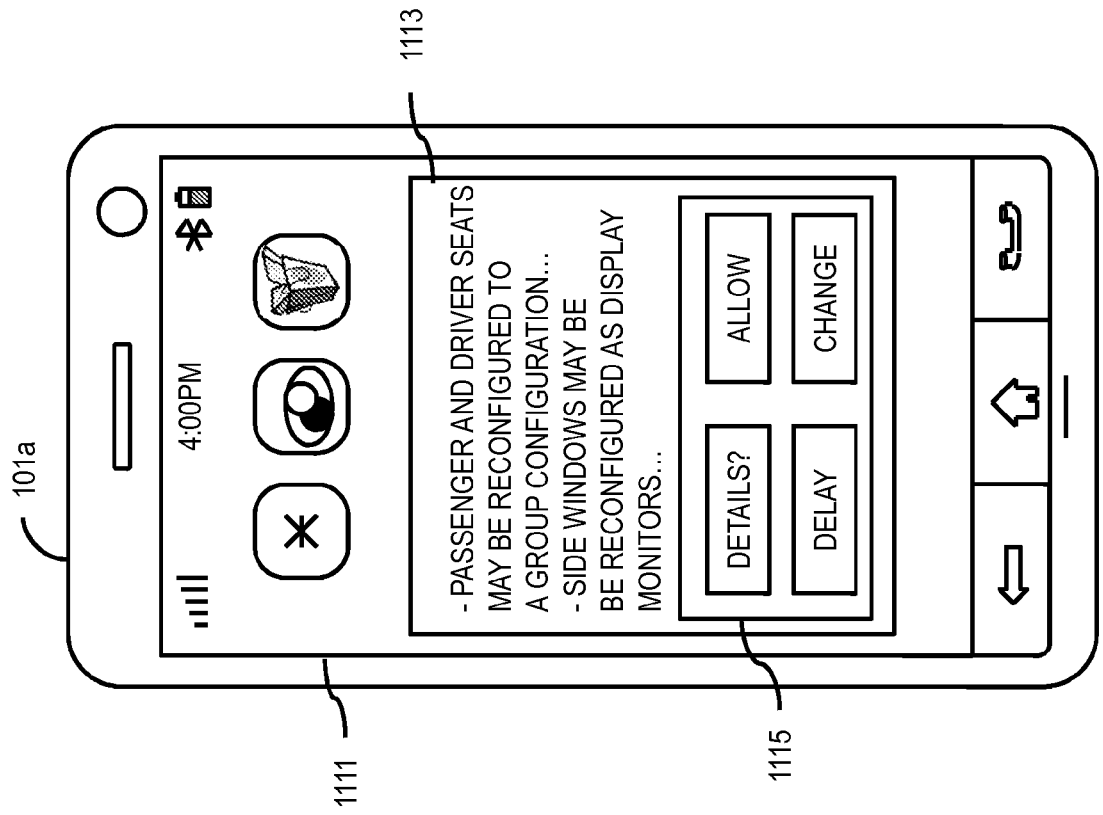

FIG. 10B illustrates a UE 101*a* with a user interface 1111 including various reconfiguration notifications and options 1113 providing information about a reconfiguration model where the seats in a vehicle environment may be reconfigured to a group configuration, side windows may be reconfigured to function as display monitors, a glass roof may be reconfigured to function as a mirror, or other like information. In one embodiment, occupants of the vehicle environment may interact and respond to the notification through options 1115, for example, to allow the reconfigurations, request for more details (e.g., timing), delay the reconfigurations, propose a change to the reconfiguration model as presented, or other like options. The information presented via the UE 101*a* may also be presented via other UEs 101 or features/devices (e.g., a door panel, a seat-back monitor, etc.) in the vehicle environment.

Figure 10C:
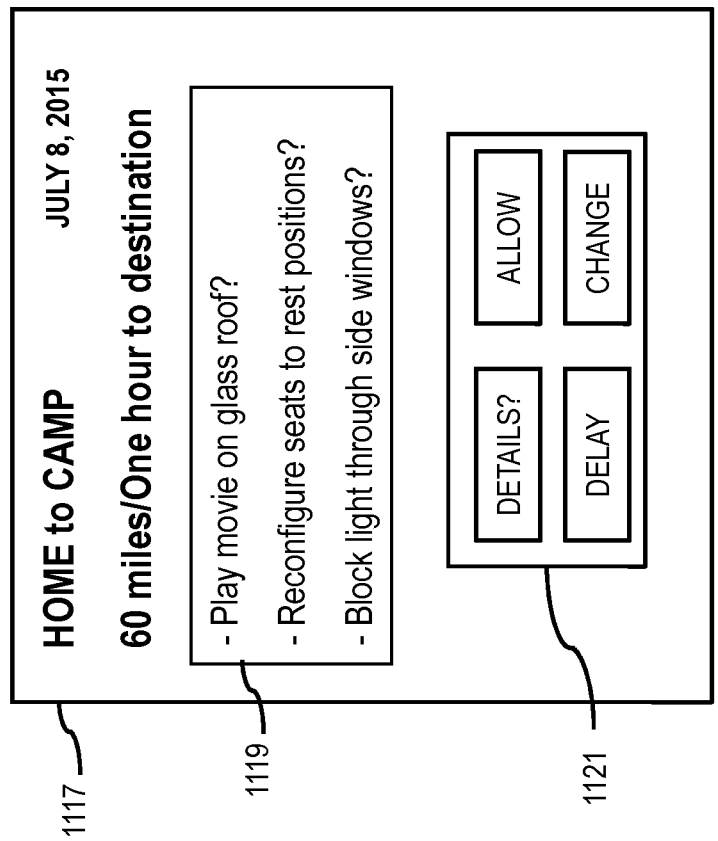

FIG. 10C illustrates a UI 1117 with reconfiguration notifications 1119 for a vehicle environment, where occupants of the vehicle environment may interact with the options 1121 to provide one or more responses to a reconfiguration platform. Again, the UI 1117 may be presented via one or more UEs 101 and/or devices in the vehicle environment.

Figure 10D:
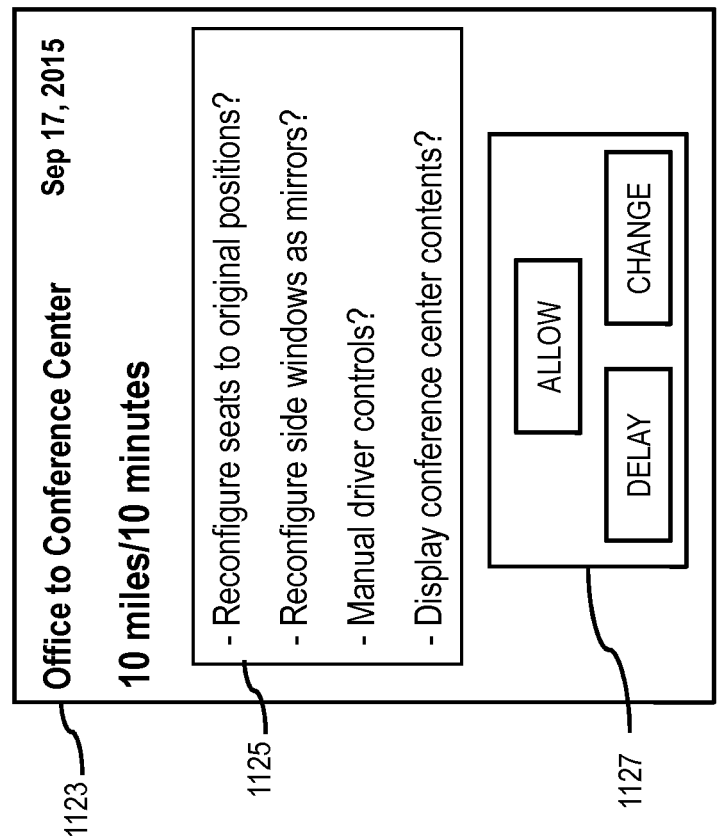

FIG. 10D illustrates a UI 1123 providing reconfiguration notifications 1125 to occupants of a vehicle environment indicating a distance and an estimated time of travel to the destination point (e.g., a conference center), where the occupants may interact with options 1127 to allow, delay or change one or more elements of the reconfiguration model 1125.

The processes described herein for determining and presenting notifications and options to users for reconfiguring a vehicle environment of the users may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
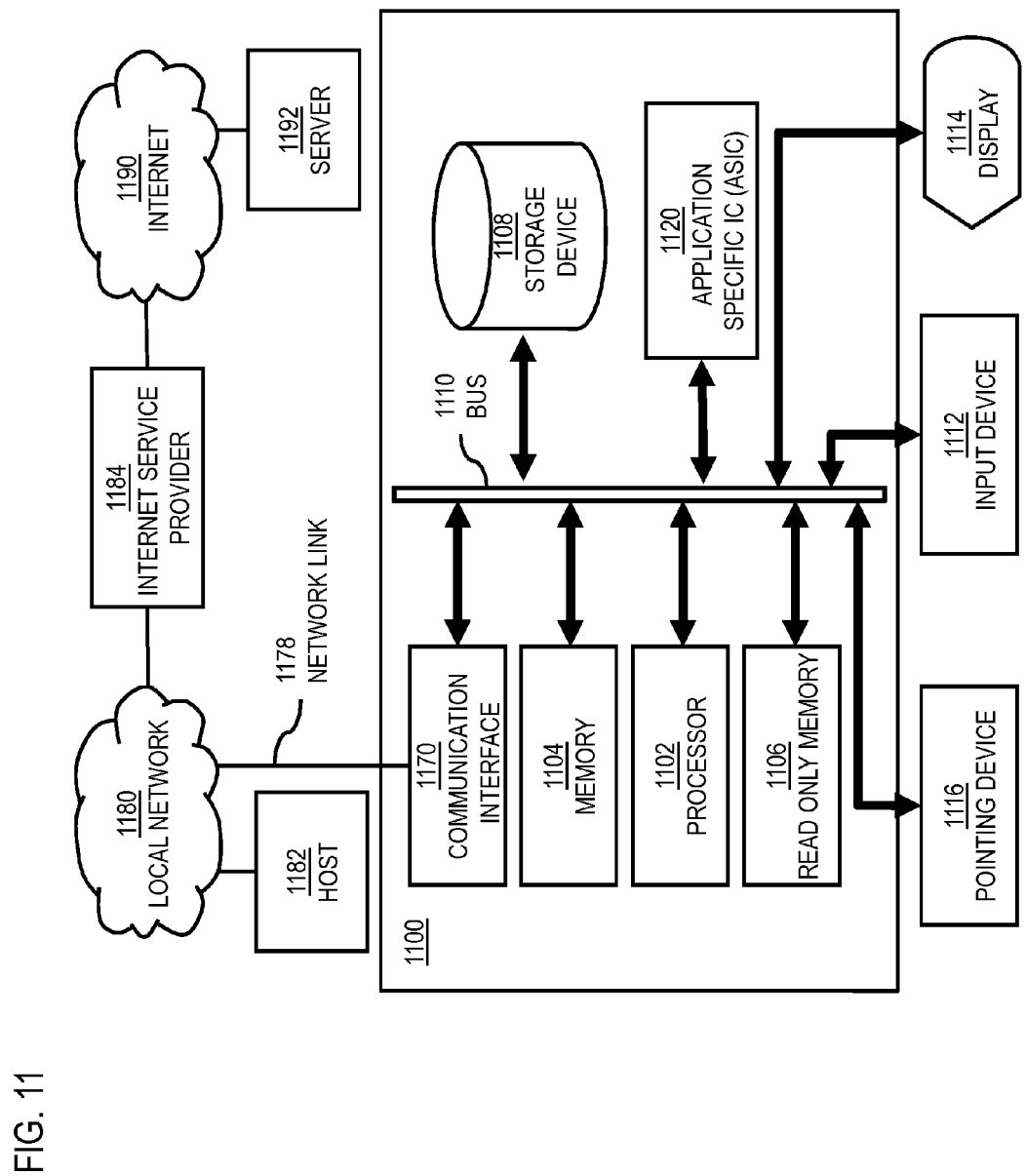
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to determine and present notifications and options to users for reconfiguring a vehicle environment of the users as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of determining and presenting notifications and options to users for reconfiguring a vehicle environment of the users.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to determine and present notifications and options to users for reconfiguring a vehicle environment of the users. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for determining and presenting notifications and options to users for reconfiguring a vehicle environment of the users. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for determining and presenting notifications and options to users for reconfiguring a vehicle environment of the users, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 113 for determining and presenting notifications and options to users for reconfiguring a vehicle environment of the users.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to determine and present notifications and options to users for reconfiguring a vehicle environment of the users as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of determining and presenting notifications and options to users for reconfiguring a vehicle environment of the users.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to determine and present notifications and options to users for reconfiguring a vehicle environment of the users. The memory 1205 also stores the data associated with or generated by the execution of the inventive steps.

Figure 13:
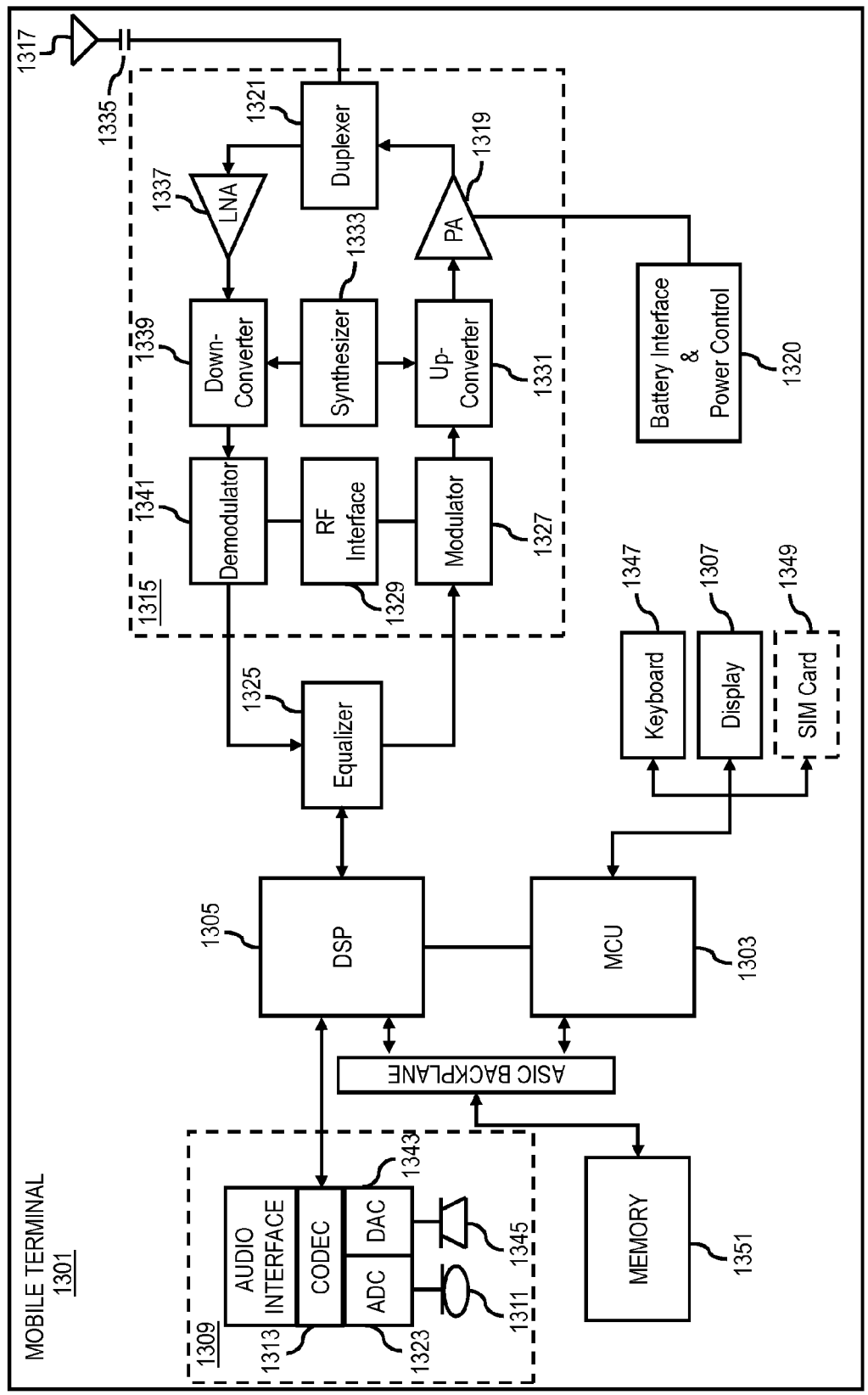
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of determining and presenting notifications and options to users for reconfiguring a vehicle environment of the users. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of determining and presenting notifications and options to users for reconfiguring a vehicle environment of the users. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to determine and present notifications and options to users for reconfiguring a vehicle environment of the users. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of determining and presenting notifications and options to users for reconfiguring a vehicle environment of the users, comprising:
    receiving at a reconfiguration server data sent over a communication network from a plurality of sensors in the vehicle environment, the configuration server comprising a processor and a memory, wherein the processor performs at least steps of:
    determining whether to initiate a reconfiguration of at least one vehicle environment for one or more users based, at least in part, on one or more reconfiguration criteria;
    determining at least one reconfiguration model for the at least one vehicle environment based, at least in part, on one or more preferences associated with the one or more users;
    causing, at least in part, a presentation of one or more notifications about the at least one reconfiguration model to the one or more users;
    determining one or more responses from the one or more users based, at least in part, on the presentation; and
    initiating the reconfiguration of the at least one vehicle environment based, at least in part, on the one or more responses,
    wherein the reconfiguration of the at least one vehicle environment comprises reconfiguring at least physical aspects of an interior of the at least one vehicle including one or more of reconfiguring seating arrangements, reconfiguring characteristics of a windshield or a rear window so as to be utilized as a video monitor, reconfiguring popup tables, reconfiguring windows, and reconfiguring floor space.

2. A method of claim 1, wherein the processor further performs at least the step of:
    causing, at least in part, the presentation of the one or more notifications via one or more user devices, one or more features in the at least one vehicle environment, or a combination thereof.

3. A method of claim 1, wherein the processor further performs at least the steps of:
    determining one or more common characteristics associated with the one or more users; and
    determining the at least one reconfiguration model based, at least in part, on the one or more common characteristics.

4. A method of claim 1, wherein the processor further performs at least the step of:
    determining an estimated time of travel information from an origin point to a destination point for at least one vehicle associated with the at least one vehicle environment,
    wherein the at least one reconfiguration model for the at least one vehicle environment, the one or more notifications, or a combination thereof is based, at least in part, on the estimated time of travel.

5. A method of claim 4, wherein the processor further performs at least the steps of:
    identifying one or more activities, one or more services, or a combination thereof available at the destination point; and
    causing, at least in part, the presentation of the one or more notifications based, at least in part, on the one or more activities, the one or more services, or a combination thereof.

6. A method of claim 4, wherein the processor further performs at least the steps of:
    causing, at least in part, the presentation of the one or more notifications, one or more user instructions, or a combination thereof to at least one controlling user; and
    initiating the reconfiguration of the at least one vehicle environment based, at least in part, on one or more responses from the at least one controlling user.

7. A method of claim 4, wherein the processor further performs at least the steps of:
    determining one or more autonomous, semi-autonomous, or a combination thereof functions of the at least one vehicle in the at least one reconfiguration model; and
    causing, at least in part, a presentation of the one or more functions in the one or more notifications to the one or more users.

8. A method of claim 1, wherein the processor further performs at least the steps of:
    determining one or more unexpected activities associated with the one or more users;
    causing, at least in part, a presentation of one or more other notifications, one or more user instructions, or a combination thereof to the one or more users; and
    initiating the reconfiguration of the at least one vehicle environment based, at least in part, on one or more responses from the one or more users to the one or more other notifications, the one or more user instructions, or a combination thereof.

9. A method of claim 1,
    wherein the reconfiguration of the at least one vehicle environment further comprises reconfiguring at least physical aspects of an exterior of the at least one vehicle.

10. A method of claim 1, wherein the processor further performs at least the steps of:
    causing, at least in part, a graphical representation of the at least one reconfiguration model in the one or more notifications to the one or more users; and
    determining one or more user interactions with the graphical representation from the one or more users to configure one or more parameters of the at least one reconfiguration model.

11. A non-transitory computer-readable storage medium carrying one or more sequences of one or more instructions stored thereon executed by a processor to perform a method of determining and presenting notifications and options to users for reconfiguring a vehicle environment of the users, the method comprising:

receiving at a reconfiguration server data sent over a communication network from a plurality of sensors in the vehicle environment, the configuration server comprising a processor and a memory, wherein the processor performs at least steps of:

determining whether to initiate a reconfiguration of at least one vehicle environment for one or more users based, at least in part, on one or more reconfiguration criteria;

determining at least one reconfiguration model for the at least one vehicle environment based, at least in part, on one or more preferences associated with the one or more users;

causing, at least in part, a presentation of one or more notifications about the at least one reconfiguration model to the one or more users;

determining one or more responses from the one or more users based, at least in part, on the presentation; and initiating the reconfiguration of the at least one vehicle environment based, at least in part, on the one or more responses, wherein the reconfiguration of the at least one vehicle environment comprises reconfiguring at least physical aspects of an interior of the at least one vehicle including one or more of reconfiguring seating arrangements, reconfiguring characteristics of a windshield or a rear window so as to be utilized as a video monitor, reconfiguring popup tables, reconfiguring windows, and reconfiguring floor space.

12. The non-transitory computer-readable storage medium of claim 11, wherein the method further comprises:
determining one or more common characteristics associated with the one or more users; and
determining the at least one reconfiguration model based, at least in part, on the one or more common characteristics.

13. The non-transitory computer-readable storage medium of claim 11, wherein the method further comprises:
determining an estimated time of travel information from an origin point to a destination point for at least one vehicle associated with the at least one vehicle environment,
wherein the at least one reconfiguration model for the at least one vehicle environment, the one or more notifications, or a combination thereof is based, at least in part, on the estimated time of travel.

14. The non-transitory computer-readable storage medium of claim 13, wherein the method further comprises:
identifying one or more activities, one or more services, or a combination thereof available at the destination point; and
causing, at least in part, the presentation of the one or more notifications based, at least in part, on the one or more activities, the one or more services, or a combination thereof.

15. The non-transitory computer-readable storage medium of claim 13, wherein the method further comprises:
causing, at least in part, the presentation of the one or more notifications, one or more user instructions, or a combination thereof to at least one controlling user; and
initiating the reconfiguration of the at least one vehicle environment based, at least in part, on one or more responses from the at least one controlling user.

16. The non-transitory computer-readable storage medium of claim 13, wherein the method further comprises:
determining one or more autonomous, semi-autonomous, or a combination thereof functions of the at least one vehicle in the at least one reconfiguration model; and
causing, at least in part, a presentation of the one or more functions in the one or more notifications to the one or more users.

17. The non-transitory computer-readable storage medium of claim 11, wherein the method further comprises:
determining one or more unexpected activities associated with the one or more users;
causing, at least in part, a presentation of one or more other notifications, one or more user instructions, or a combination thereof to the one or more users; and
initiating the reconfiguration of the at least one vehicle environment based, at least in part, on one or more responses from the one or more users to the one or more other notifications, the one or more user instructions, or a combination thereof.

18. The non-transitory computer-readable storage medium of claim 11, wherein the method further comprises:
causing, at least in part, the presentation of the one or more notifications via one or more user devices, one or more features in the at least one vehicle environment, or a combination thereof.

19. The non-transitory computer-readable storage medium of claim 11, wherein the reconfiguration of the at least one vehicle environment further comprises reconfiguring at least physical aspects of an exterior of the at least one vehicle.

20. The non-transitory computer-readable storage medium of claim 11, wherein the method further comprises:
causing, at least in part, a graphical representation of the at least one reconfiguration model in the one or more notifications to the one or more users; and
determining one or more user interactions with the graphical representation from the one or more users to configure one or more parameters of the at least one reconfiguration model.

* * * * *